(12) United States Patent
Threadgill

(10) Patent No.: US 12,450,374 B2
(45) Date of Patent: *Oct. 21, 2025

(54) SYSTEM AND METHOD FOR MONITORING DATA INPUT INTO MACHINE LEARNING MODELS

(71) Applicant: Jordon Threadgill, Pensacola, FL (US)

(72) Inventor: Jordon Threadgill, Pensacola, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/747,859

(22) Filed: Jun. 19, 2024

(65) Prior Publication Data

US 2024/0427915 A1   Dec. 26, 2024

Related U.S. Application Data

(63) Continuation of application No. 18/212,120, filed on Jun. 20, 2023, now Pat. No. 12,277,240.

(51) Int. Cl.
*G06F 21/62* (2013.01)
*H04L 41/16* (2022.01)
*H04L 41/22* (2022.01)

(52) U.S. Cl.
CPC .......... *G06F 21/6209* (2013.01); *H04L 41/16* (2013.01); *H04L 41/22* (2013.01)

(58) Field of Classification Search
CPC ...... G06F 21/6209; H04L 41/16; H04L 41/22
See application file for complete search history.

(56) References Cited

U.S. PATENT DOCUMENTS

| | | | |
|---|---|---|---|
| 9,398,042 B1 * | 7/2016 | Dodke | H04L 63/1433 |
| 2014/0195466 A1 * | 7/2014 | Phillipps | G06F 16/00 706/12 |
| 2020/0401645 A1 * | 12/2020 | Brown | H04W 4/14 |

* cited by examiner

*Primary Examiner* — Vance M Little
(74) *Attorney, Agent, or Firm* — AdamsIP, LLC; Edward Brinkley Garner, III; J. Hunter Adams

(57) ABSTRACT

A system and method for system and method for monitoring data before it is input into a machine learning model is provided. Generally, the system and methods of the present disclosure are designed to allow for the secure use of machine learning modules in virtual team environments. A chat module may be used to allow a user to control the use of one or more machine learning modules by inputting commands. The chat module may be incorporated into an existing user interface to add machine learning module functionality to said existing user interface. In some embodiments, a security module may monitor input data entered into the chat module by a user to prevent sensitive information from being distributed to the machine learning module.

19 Claims, 10 Drawing Sheets

FIG. 7

SYSTEM AND METHOD FOR MONITORING DATA INPUT INTO MACHINE LEARNING MODELS

CROSS-REFERENCE TO RELATED APPLICATIONS

This application claims priority to U.S. patent application Ser. No. 18/212,120 filed Jun. 20, 2023, in which all applications are incorporated herein in their entirety by reference.

FIELD OF THE DISCLOSURE

The subject matter of the present disclosure refers generally to a system and method for monitoring data before it is input into a machine learning model.

BACKGROUND

Machine learning models have become an increasingly important tool in business due to their ability to increase efficiency and improve decision-making of users. Additionally, the optimization of logistics and improved predictive maintenance for equipment has further increased business productivity. However, concerns have been raised about the potential loss of intellectual property of businesses that use third-party machine learning models since machine learning models often collect the data entered by users therein to assist with the learning process. What was once confidential information belonging to the business may then be redistributed to the public, resulting in the loss of the business's intellectual property. The areas of intellectual property where this is most concerning is the realms of trade secrets and/or patents. Trade secrets revealed to the public through machine learning model may be considered in the public domain, and the public distribution of research/development of unpatented ideas may result in the complete loss of a business's ability to receive a patent or even give a competitor an edge in developing around the potentially patentable material prior to any licensing agreements being put in place. The income loss that may come as a result of such public disclosures could result in the financial ruin of a business since they would no longer have the competitive edge gained by such intellectual property. Further, intellectual property loss in this manner may be purely accidental as employees of the business attempt to use teams-based software that incorporates machine learning models to further increase efficiency.

There are also legal issues that businesses must consider when using machine learning models. Machine learning models often rely on large amounts of personal data, such as customer information or employee records. Compliance with data protection regulations may be difficult if a business is not careful, and it is important that appropriate consent is obtained for the collection and use of this personal data in order to avoid massive lawsuits and fines. Further, machine learning models may incorporate proprietary data or algorithms into any generated output, which may raise different intellectual property issues than those mentioned above. If a business is not careful to obtain appropriate licenses and permissions for the use of any third-party data or algorithms, as well as adequate protections to prevent infringement of their own intellectual property rights, costly litigation might ensue. Moreover, machine learning models can be difficult to understand and interpret, raising issues related to transparency and accountability. As such, businesses must ensure that any machine learning models used to perform certain tasks are transparent, understandable, and provide clear explanations of how decisions are made. Yet, not every machine learning model mitigates these risks equally when given a particular task, making it difficult for businesses to determine which machine learning model is best for their particular business.

Accordingly, there is a need in the art for a system and method for monitoring data that is to be submitted to a machine learning module to access if said data would result in data loss and subsequently prevent said data from being transmitted to a machine learning model if it is determined that data loss would occur. Further, there is a need in the art for a way for businesses to monitor the usage of machine learning models by their employees to help them determine which machine learning models might be best for the business.

SUMMARY

A system and method for system and method for monitoring data before it is input into a machine learning model is provided. In one aspect, the system allows a user to input commands into a chat interface in a way that allows a user to choose which machine learning module performs a desired task. In another aspect, the system incorporates machine learning functionality into existing user interfaces. In yet another aspect, the system monitors data as it is entered into the chat interface to prevent sensitive information from being disseminated to a desired machine learning module. Generally, the system and methods of the present disclosure are designed to allow for the secure use of machine learning modules in virtual team environments. The system 400 generally comprises a computing entity 200 having a user interface 411, a security module 428, a machine learning module 425, processor 220 operably connected to said computing entity 200, security module 428, and machine learning module 425, display operably connected to said processor 220, and non-transitory computer-readable medium coupled to said processor 220 and having instructions stored thereon. To prevent unauthorized access to the system, secondary security devices and permissions levels may be used.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other systems for carrying out the same purpose of the system and method disclosed herein. Those skilled in the pertinent art should also realize that such equivalent designs or modifications do not depart from the scope of the system and method of the present disclosure.

DESCRIPTION OF THE DRAWINGS

These and other features, aspects, and advantages of the present disclosure will become better understood with regard to the following description, appended claims, and accompanying drawings where:

FIG. 7 illustrates a system embodying features consistent with the principles of the present disclosure and being used within an environment.

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For instance, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises", and grammatical equivalents thereof are used herein to mean that other components, steps, etc. are optionally present. For instance, a system "comprising" components A, B, and C can contain only components A, B, and C, or can contain not only components A, B, and C, but also one or more other components. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility). As will be evident from the disclosure provided below, the present invention satisfies the need for a system and method capable of reducing data transferred between computing devices. As used herein, the term "security information and event management (SIEM)" and grammatical equivalents thereof are used herein to mean a single security management system that includes both security information management (SIM) and security event management (SEM).

Figure 1:
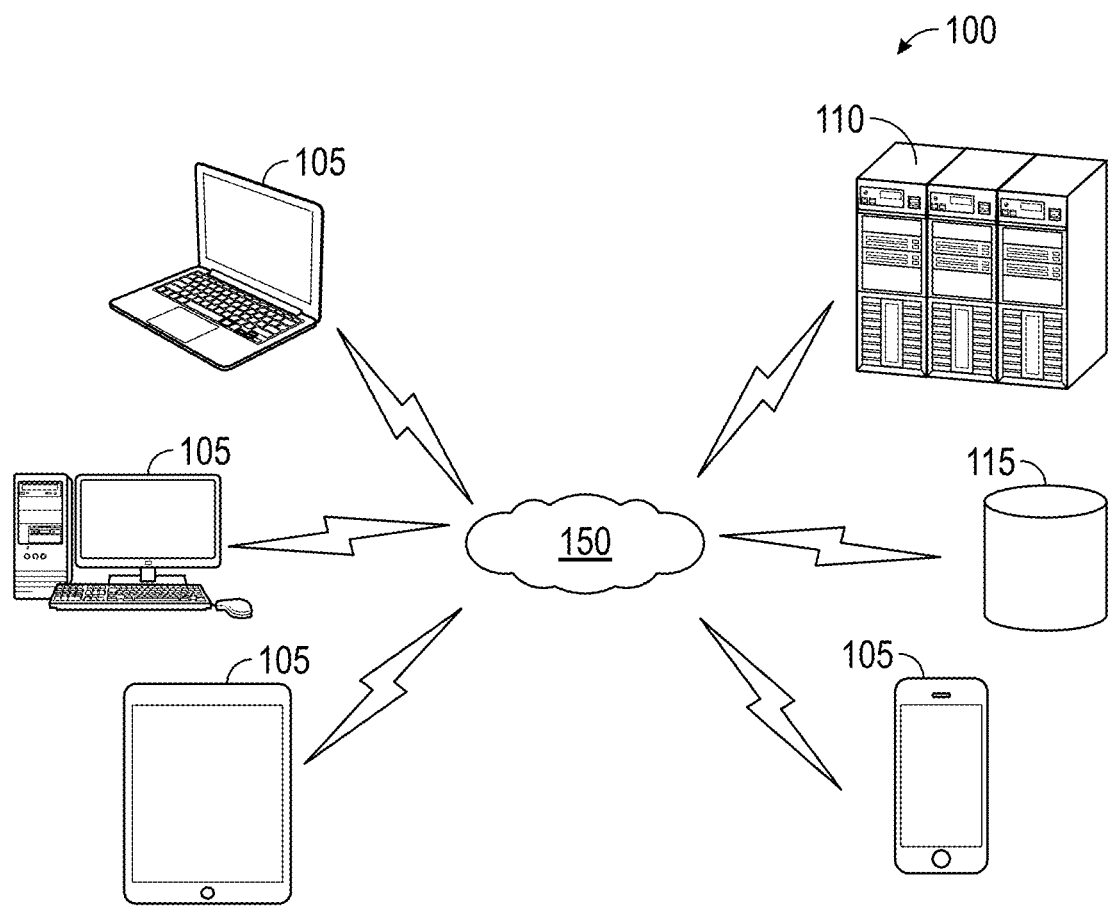
FIG. 1 illustrates a system embodying features consistent with the principles of the present disclosure.

FIG. 1 depicts an exemplary environment 100 of the system 400 consisting of clients 105 connected to a server 110 and/or database 115 via a network 150. Clients 105 are devices of users 405 that may be used to access servers 110 and/or databases 115 through a network 150. A network 150 may comprise of one or more networks of any kind, including, but not limited to, a local area network (LAN), a wide area network (WAN), metropolitan area networks (MAN), a telephone network, such as the Public Switched Telephone Network (PSTN), an intranet, the Internet, a memory device, another type of network, or a combination of networks. In a preferred embodiment, computing entities 200 may act as clients 105 for a user 405. For instance, a client 105 may include a personal computer, a wireless telephone, a streaming device, a "smart" television, a personal digital assistant (PDA), a laptop, a smart phone, a tablet computer, or another type of computation or communication interface 280. Servers 110 may include devices that access, fetch, aggregate, process, search, provide, and/or maintain documents. Although FIG. 1 depicts a preferred embodiment of an environment 100 for the system 400, in other implementations, the environment 100 may contain fewer components, different components, differently arranged components, and/or additional components than those depicted in FIG. 1. Alternatively, or additionally, one or more components of the environment 100 may perform one or more other tasks described as being performed by one or more other components of the environment 100.

As depicted in FIG. 1, one embodiment of the system 400 may comprise a server 110. Although shown as a single server 110 in FIG. 1, a server 110 may, in some implementations, be implemented as multiple devices interlinked together via the network 150, wherein the devices may be distributed over a large geographic area and performing different functions or similar functions. For instance, two or more servers 110 may be implemented to work as a single server 110 performing the same tasks. Alternatively, one server 110 may perform the functions of multiple servers 110. For instance, a single server 110 may perform the tasks of a web server and an indexing server 110. Additionally, it is understood that multiple servers 110 may be used to operably connect the processor 220 to the database 115 and/or other content repositories. The processor 220 may be operably connected to the server 110 via wired or wireless connection. Types of servers 110 that may be used by the system 400 include, but are not limited to, search servers, document indexing servers, and web servers, or any combination thereof.

Search servers may include one or more computing entities 200 designed to implement a search engine, such as a documents/records search engine, general webpage search engine, etc. Search servers may, for instance, include one or more web servers designed to receive search queries and/or inputs from users 405, search one or more databases 115 in response to the search queries and/or inputs, and provide documents or information, relevant to the search queries and/or inputs, to users 405. In some implementations, search servers may include a web search server that may provide webpages to users 405, wherein a provided webpage may include a reference to a web server at which the desired information and/or links are located. The references to the web server at which the desired information is located may be included in a frame and/or text box, or as a link to the desired information/document. Document indexing servers may include one or more devices designed to index documents available through networks 150. Document indexing servers may access other servers 110, such as web servers that host content, to index the content. In some implementations, document indexing servers may index documents/ records stored by other servers 110 connected to the network 150. Document indexing servers may, for instance, store and index content, information, and documents relating to user accounts and user-generated content. Web servers may include servers 110 that provide webpages to clients 105. For instance, the webpages may be HTML-based webpages. A web server may host one or more websites. As used herein, a website may refer to a collection of related webpages. Frequently, a website may be associated with a single domain name, although some websites may potentially encompass more than one domain name. The concepts described herein may be applied on a per-website basis. Alternatively, in some implementations, the concepts described herein may be applied on a per-webpage basis.

As used herein, a database 115 refers to a set of related data and the way it is organized. Access to this data is usually provided by a database management system (DBMS) consisting of an integrated set of computer software that allows users 405 to interact with one or more databases 115 and provides access to all of the data contained in the database 115. The DBMS provides various functions that allow entry, storage and retrieval of large quantities of information and provides ways to manage how that information is organized. Because of the close relationship between the database 115 and the DBMS, as used herein, the term database 115 refers to both a database 115 and DBMS.

Figure 2:
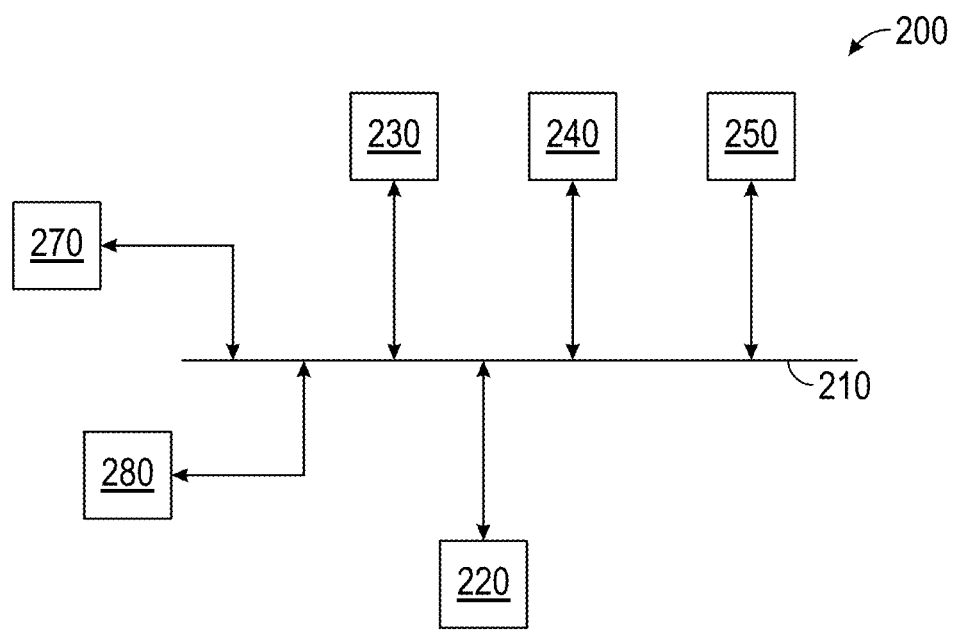
FIG. 2 illustrates a system embodying features consistent with the principles of the present disclosure.

FIG. 2 is an exemplary diagram of a client 105, server 110, and/or or database 115 (hereinafter collectively referred to as "computing entity 200"), which may correspond to one or more of the clients 105, servers 110, and databases 115 according to an implementation consistent with the principles of the invention as described herein. The computing entity 200 may comprise a bus 210, a processor 220, memory 304, a storage device 250, a peripheral device 270, and a communication interface 280 (such as wired or wireless communication device). The bus 210 may be defined as one or more conductors that permit communication among the components of the computing entity 200. The processor 220 may be defined as logic circuitry that responds to and processes the basic instructions that drive the computing entity 200. Memory 304 may be defined as the integrated circuitry that stores information for immediate use in a computing entity 200. A peripheral device 270 may be defined as any hardware used by a user 405 and/or the computing entity 200 to facilitate communicate between the two. A storage device 250 may be defined as a device used to provide mass storage to a computing entity 200. A communication interface 280 may be defined as any transceiver-like device that enables the computing entity 200 to communicate with other devices and/or computing entities 200.

The bus 210 may comprise a high-speed interface 308 and/or a low-speed interface 312 that connects the various components together in a way such they may communicate with one another. A high-speed interface 308 manages bandwidth-intensive operations for computing device 300, while a low-speed interface 312 manages lower bandwidth-intensive operations. In some preferred embodiments, the high-speed interface 308 of a bus 210 may be coupled to the memory 304, display 316, and to high-speed expansion ports 310, which may accept various expansion cards such as a graphics processing unit (GPU). In other preferred embodiments, the low-speed interface 312 of a bus 210 may be coupled to a storage device 250 and low-speed expansion ports 314. The low-speed expansion ports 314 may include various communication ports, such as USB, Bluetooth, Ethernet, wireless Ethernet, etc. Additionally, the low-speed expansion ports 314 may be coupled to one or more peripheral devices 270, such as a keyboard, pointing device, scanner, and/or a networking device, wherein the low-speed expansion ports 314 facilitate the transfer of input data from the peripheral devices 270 to the processor 220 via the low-speed interface 312.

The processor 220 may comprise any type of conventional processor or microprocessor that interprets and executes computer readable instructions. The processor 220 is configured to perform the operations disclosed herein based on instructions stored within the system 400. The processor 220 may process instructions for execution within the computing entity 200, including instructions stored in memory 304 or on a storage device 250, to display graphical information for a graphical user interface (GUI) on an external peripheral device 270, such as a display 316. The processor 220 may provide for coordination of the other components of a computing entity 200, such as control of user interfaces 411, applications run by a computing entity 200, and wireless communication by a communication interface 280 of the computing entity 200. The processor 220 may be any processor or microprocessor suitable for executing instructions. In some embodiments, the processor 220 may have a memory device therein or coupled thereto suitable for storing the data, content, or other information or material disclosed herein. In some instances, the processor 220 may be a component of a larger computing entity 200. A computing entity 200 that may house the processor 220 therein may include, but are not limited to, laptops, desktops, workstations, personal digital assistants, servers 110, mainframes, cellular telephones, tablet computers, smart televisions, streaming devices, smart watches, or any other similar device. Accordingly, the inventive subject matter disclosed herein, in full or in part, may be implemented or utilized in devices including, but are not limited to, laptops, desktops, workstations, personal digital assistants, servers 110, mainframes, cellular telephones, tablet computers, smart televisions, streaming devices, or any other similar device.

Memory 304 stores information within the computing device 300. In some preferred embodiments, memory 304 may include one or more volatile memory units. In another preferred embodiment, memory 304 may include one or more non-volatile memory units. Memory 304 may also include another form of computer-readable medium, such as a magnetic, solid state, or optical disk. For instance, a portion of a magnetic hard drive may be partitioned as a dynamic scratch space to allow for temporary storage of information that may be used by the processor 220 when faster types of memory, such as random-access memory (RAM), are in high demand. A computer-readable medium may refer to a non-transitory computer-readable memory device. A memory device may refer to storage space within a single storage device 250 or spread across multiple storage devices 250. The memory 304 may comprise main memory 230 and/or read only memory (ROM) 240. In a preferred embodiment, the main memory 230 may comprise RAM or another type of dynamic storage device 250 that stores information and instructions for execution by the processor 220. ROM 240 may comprise a conventional ROM device or another type of static storage device 250 that stores static information and instructions for use by processor 220. The storage device 250 may comprise a magnetic and/or optical recording medium and its corresponding drive.

As mentioned earlier, a peripheral device 270 is a device that facilitates communication between a user 405 and the processor 220. The peripheral device 270 may include, but is not limited to, an input device and/or an output device. As used herein, an input device may be defined as a device that allows a user 405 to input data and instructions that is then converted into a pattern of electrical signals in binary code that are comprehensible to a computing entity 200. An input device of the peripheral device 270 may include one or more conventional devices that permit a user 405 to input information into the computing entity 200, such as a controller, scanner, phone, camera, scanning device, keyboard, a mouse, a pen, voice recognition and/or biometric mechanisms, etc. As used herein, an output device may be defined as a device that translates the electronic signals received from a computing entity 200 into a form intelligible to the user 405. An output device of the peripheral device 270 may include one or more conventional devices that output information to a user 405, including a display 316, a printer, a speaker, an alarm, a projector, etc. Additionally, storage devices 250, such as CD-ROM drives, and other computing entities 200 may act as a peripheral device 270 that may act independently from the operably connected computing entity 200. For instance, a streaming device may transfer data to a smartphone, wherein the smartphone may use that data in a manner separate from the streaming device.

The storage device 250 is capable of providing the computing entity 200 mass storage. In some embodiments, the storage device 250 may comprise a computer-readable medium such as the memory 304, storage device 250, or memory 304 on the processor 220. A computer-readable medium may be defined as one or more physical or logical memory devices and/or carrier waves. Devices that may act as a computer readable medium include, but are not limited to, a hard disk device, optical disk device, tape device, flash memory or other similar solid-state memory device, or an array of devices, including devices in a storage area network or other configurations. Examples of computer-readable mediums include, but are not limited to, magnetic media such as hard disks, floppy disks, and magnetic tape; optical media such as CD ROM discs and DVDs; magneto-optical media such as optical discs; and hardware devices that are specially configured to store and perform programming instructions, such as ROM 240, RAM, flash memory, and the like.

In an embodiment, a computer program may be tangibly embodied in the storage device 250. The computer program may contain instructions that, when executed by the processor 220, performs one or more steps that comprise a method, such as those methods described herein. The instructions within a computer program may be carried to the processor 220 via the bus 210. Alternatively, the computer program may be carried to a computer-readable medium, wherein the information may then be accessed from the computer-readable medium by the processor 220 via the bus 210 as needed. In a preferred embodiment, the software instructions may be read into memory 304 from another computer-readable medium, such as data storage device 250, or from another device via the communication interface 280. Alternatively, hardwired circuitry may be used in place of or in combination with software instructions to implement processes consistent with the principles as described herein. Thus, implementations consistent with the invention as described herein are not limited to any specific combination of hardware circuitry and software.

Figure 3:
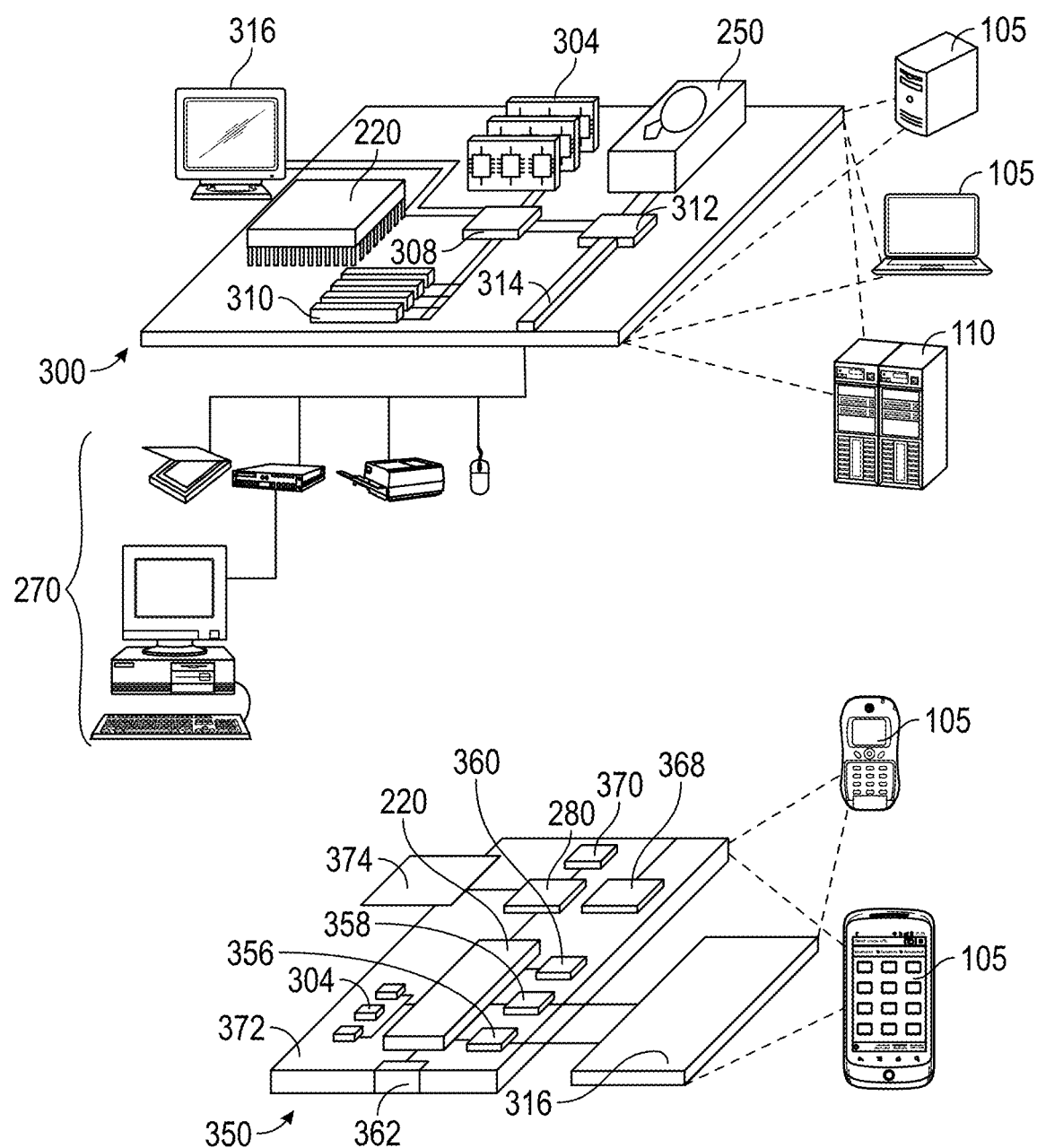
FIG. 3 illustrates a system embodying features consistent with the principles of the present disclosure.

FIG. 3 depicts exemplary computing entities 200 in the form of a computing device 300 and mobile computing device 350, which may be used to carry out the various embodiments of the invention as described herein. A computing device 300 is intended to represent various forms of digital computers, such as laptops, desktops, workstations, servers 110, databases 115, mainframes, and other appropriate computers. A mobile computing device 350 is intended to represent various forms of mobile devices, such as scanners, scanning devices, personal digital assistants, cellular telephones, smart phones, tablet computers, and other similar devices. The various components depicted in FIG. 3, as well as their connections, relationships, and functions are meant to be examples only, and are not meant to limit the implementations of the invention as described herein. The computing device 300 may be implemented in a number of different forms, as shown in FIGS. 1 and 3. For instance, a computing device 300 may be implemented as a server 110 or in a group of servers 110. Computing devices 300 may also be implemented as part of a rack server system. In addition, a computing device 300 may be implemented as a personal computer, such as a desktop computer or laptop computer. Alternatively, components from a computing device 300 may be combined with other components in a mobile device, thus creating a mobile computing device 350. Each mobile computing device 350 may contain one or more computing devices 300 and mobile devices, and an entire system may be made up of multiple computing devices 300 and mobile devices communicating with each other as depicted by the mobile computing device 350 in FIG. 3. The computing entities 200 consistent with the principles of the invention as disclosed herein may perform certain receiving, communicating, generating, output providing, correlating, and storing operations as needed to perform the various methods as described in greater detail below.

In the embodiment depicted in FIG. 3, a computing device 300 may include a processor 220, memory 304, a storage device 250, high-speed expansion ports 310, low-speed expansion ports 314, and bus 210 operably connecting the processor 220, memory 304, storage device 250, high-speed expansion ports 310, and low-speed expansion ports 314. In one preferred embodiment, the bus 210 may comprise a high-speed interface 308 connecting the processor 220 to the memory 304 and high-speed expansion ports 310 as well as a low-speed interface 312 connecting to the low-speed expansion ports 314 and the storage device 250. Because each of the components are interconnected using the bus 210, they may be mounted on a common motherboard as depicted in FIG. 3 or in other manners as appropriate. The processor 220 may process instructions for execution within the computing device 300, including instructions stored in memory 304 or on the storage device 250. Processing these instructions may cause the computing device 300 to display graphical information for a GUI on an output device, such as a display 316 coupled to the high-speed interface 308. In other implementations, multiple processors and/or multiple buses may be used, as appropriate, along with multiple memory units and/or multiple types of memory. Additionally, multiple computing devices may be connected, wherein each device provides portions of the necessary operations.

A mobile computing device 350 may include a processor 220, memory 304 a peripheral device 270 (such as a display 316, a communication interface 280, and a transceiver 368, among other components). A mobile computing device 350 may also be provided with a storage device 250, such as a micro-drive or other previously mentioned storage device 250, to provide additional storage. Preferably, each of the components of the mobile computing device 350 are interconnected using a bus 210, which may allow several of the components of the mobile computing device 350 to be mounted on a common motherboard as depicted in FIG. 3 or in other manners as appropriate. In some implementations, a computer program may be tangibly embodied in an information carrier. The computer program may contain instructions that, when executed by the processor 220, perform one or more methods, such as those described herein. The information carrier is preferably a computer-readable medium, such as memory, expansion memory 374, or memory 304 on the processor 220 such as ROM 240, that may be received via the transceiver or external interface 362. The mobile computing device 350 may be implemented in a number of different forms, as shown in FIG. 3. For instance, a mobile computing device 350 may be implemented as a cellular telephone, part of a smart phone, personal digital assistant, or other similar mobile device.

The processor 220 may execute instructions within the mobile computing device 350, including instructions stored in the memory 304 and/or storage device 250. The processor 220 may be implemented as a chipset of chips that may include separate and multiple analog and/or digital processors. The processor 220 may provide for coordination of the other components of the mobile computing device 350, such as control of the user interfaces 411, applications run by the mobile computing device 350, and wireless communication by the mobile computing device 350. The processor 220 of the mobile computing device 350 may communicate with a user 405 through the control interface 358 coupled to a peripheral device 270 and the display interface 356 coupled to a display 316. The display 316 of the mobile computing device 350 may include, but is not limited to, Liquid Crystal Display (LCD), Light Emitting Diode (LED) display, Organic Light Emitting Diode (OLED) display, and Plasma Display Panel (PDP), holographic displays, augmented reality displays, virtual reality displays, or any combination thereof. The display interface 356 may include appropriate circuitry for causing the display 316 to present graphical and other information to a user 405. The control interface 358 may receive commands from a user 405 via a peripheral device 270 and convert the commands into a computer readable signal for the processor 220. In addition, an external interface 362 may be provided in communication with processor 220, which may enable near area communication of the mobile computing device 350 with other devices. The external interface 362 may provide for wired communications in some implementations or wireless communication in other implementations. In a preferred embodiment, multiple interfaces may be used in a single mobile computing device 350 as is depicted in FIG. 3.

Memory 304 stores information within the mobile computing device 350. Devices that may act as memory 304 for the mobile computing device 350 include, but are not limited to computer-readable media, volatile memory, and non-volatile memory. Expansion memory 374 may also be provided and connected to the mobile computing device 350 through an expansion interface 372, which may include a Single In-Line Memory Module (SIM) card interface or micro secure digital (Micro-SD) card interface. Expansion memory 374 may include, but is not limited to, various types of flash memory and non-volatile random-access memory (NVRAM). Such expansion memory 374 may provide extra storage space for the mobile computing device 350. In addition, expansion memory 374 may store computer programs or other information that may be used by the mobile computing device 350. For instance, expansion memory 374 may have instructions stored thereon that, when carried out by the processor 220, cause the mobile computing device 350 perform the methods described herein. Further, expansion memory 374 may have secure information stored thereon; therefore, expansion memory 374 may be provided as a security module 428 for a mobile computing device 350, wherein the security module 428 may be programmed with instructions that permit secure use of a mobile computing device 350. In addition, expansion memory 374 having secure applications and secure information stored thereon may allow a user 405 to place identifying information on the expansion memory 374 via the mobile computing device 350 in a non-hackable manner.

A mobile computing device 350 may communicate wirelessly through the communication interface 280, which may include digital signal processing circuitry where necessary. The communication interface 280 may provide for communications under various modes or protocols, including, but not limited to, Global System Mobile Communication (GSM), Short Message Services (SMS), Enterprise Messaging System (EMS), Multimedia Messaging Service (MMS), Code Division Multiple Access (CDMA), Time Division Multiple Access (TDMA), Personal Digital Cellular (PDC), Wideband Code Division Multiple Access (WCDMA), IMT Multi-Carrier (CDMAX 0), and General Packet Radio Service (GPRS), or any combination thereof. Such communication may occur, for example, through a transceiver 368. Short-range communication may occur, such as using a Bluetooth, WIFI, or other such transceiver 368. In addition, a Global Positioning System (GPS) receiver module 370 may provide additional navigation- and location-related wireless data to the mobile computing device 350, which may be used as appropriate by applications running on the mobile computing device 350. Alternatively, the mobile computing device 350 may communicate audibly using an audio codec 360, which may receive spoken information from a user 405 and covert the received spoken information into a digital form that may be processed by the processor 220. The audio codec 360 may likewise generate audible sound for a user 405, such as through a speaker, e.g., in a handset of mobile computing device 350. Such sound may include sound from voice telephone calls, recorded sound such as voice messages, music files, etc. Sound may also include sound generated by applications operating on the mobile computing device 350.

The power supply may be any source of power that provides the system 400 with electricity. In a preferred embodiment, the primary power source of the system is a stationary power source, such as a standard wall outlet. In one preferred embodiment, the system 400 may comprise of multiple power supplies that may provide power to the system 400 in different circumstances. For instance, the system 400 may be connected to a backup battery system, which may provide power to the system 400 when it's primary power source cannot provide power and so long as the batteries of the backup battery system are charged. In this way, the system 400 may receive power even in conditions in which traditional power sources are not working, allowing users to continue to use the system so that said system may review input data to prevent sensitive data breaches.

Figure 4:
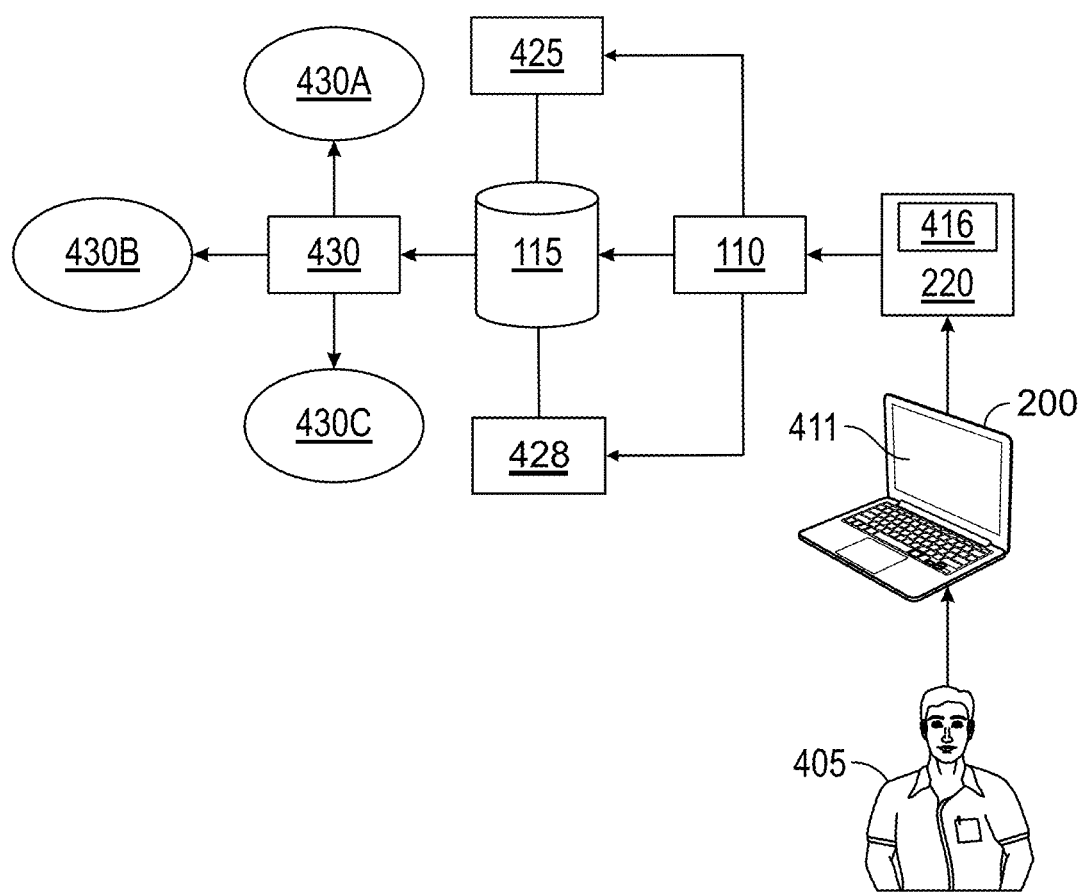
FIG. 4 illustrates a system for managing the transfer of data between a computing device having a chat module and a computing device hosting a machine learning model.
Figure 5:
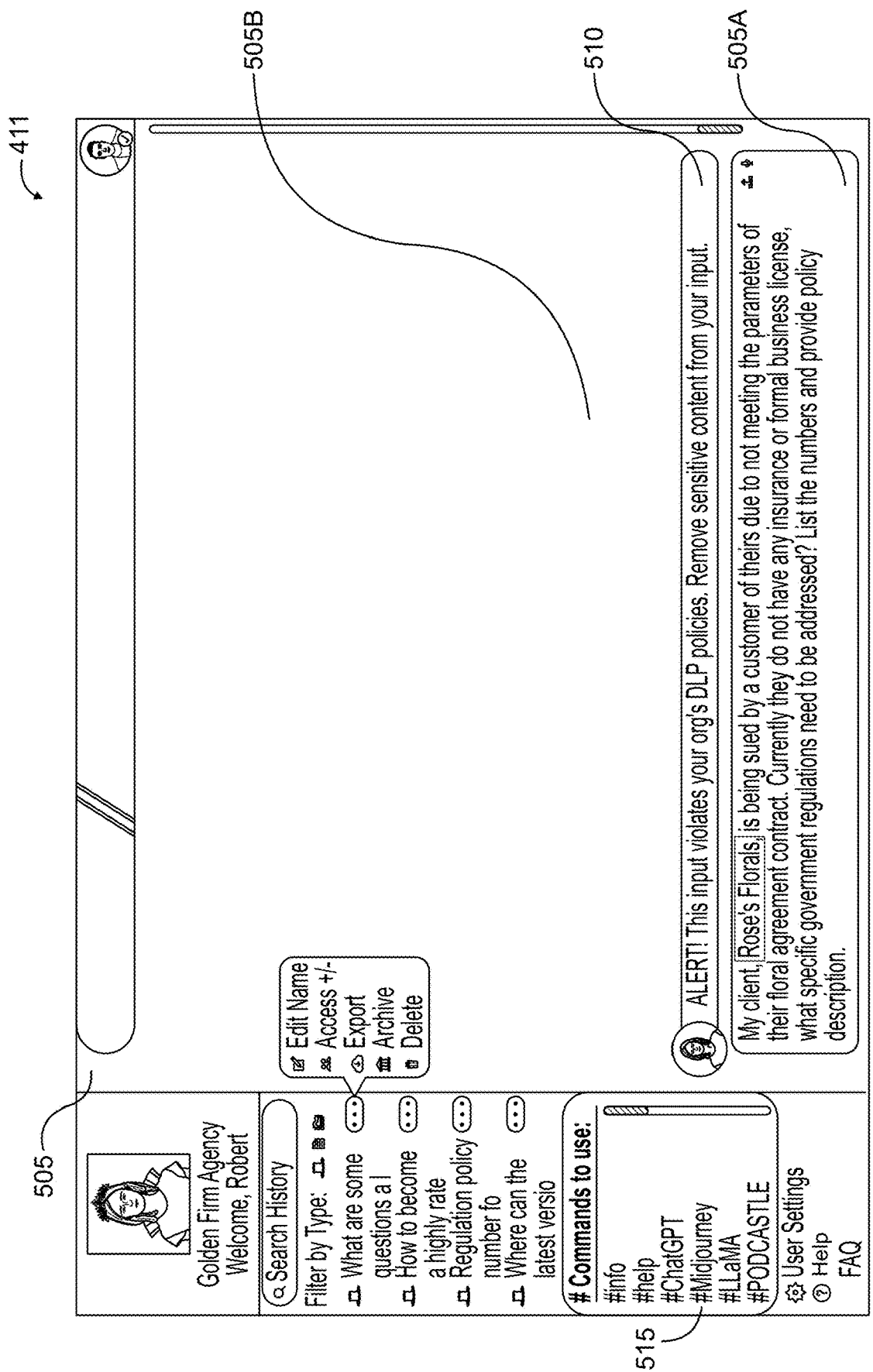
FIG. 5 illustrates a 1-1 chat user interface for managing the transfer of data between a computing device having a chat module and a computing device hosting a machine learning model.
Figure 6:
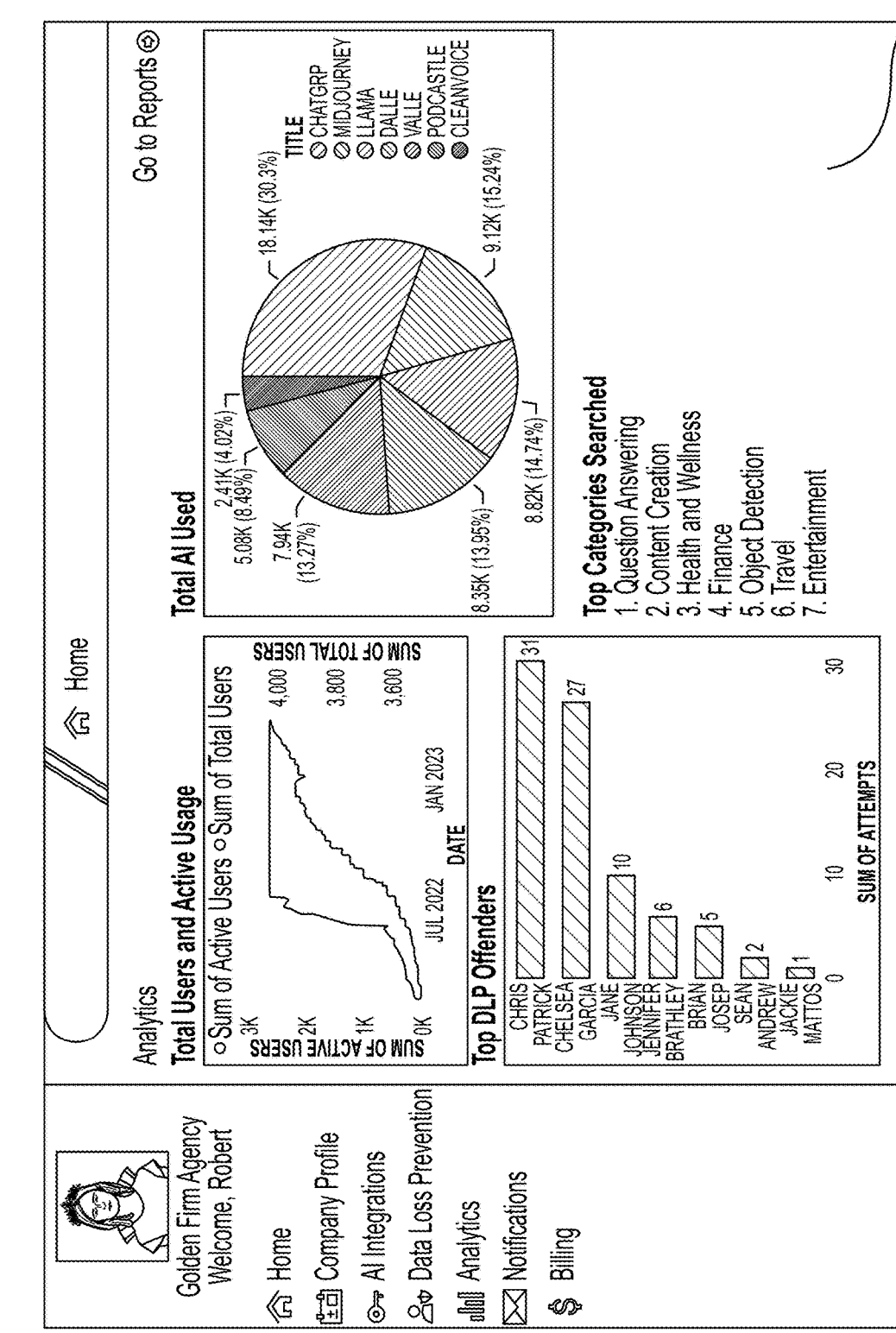
FIG. 6 illustrates a team user interface for managing the transfer of data between a computing device having a chat module and a computing device hosting a machine learning model.
Figure 7:
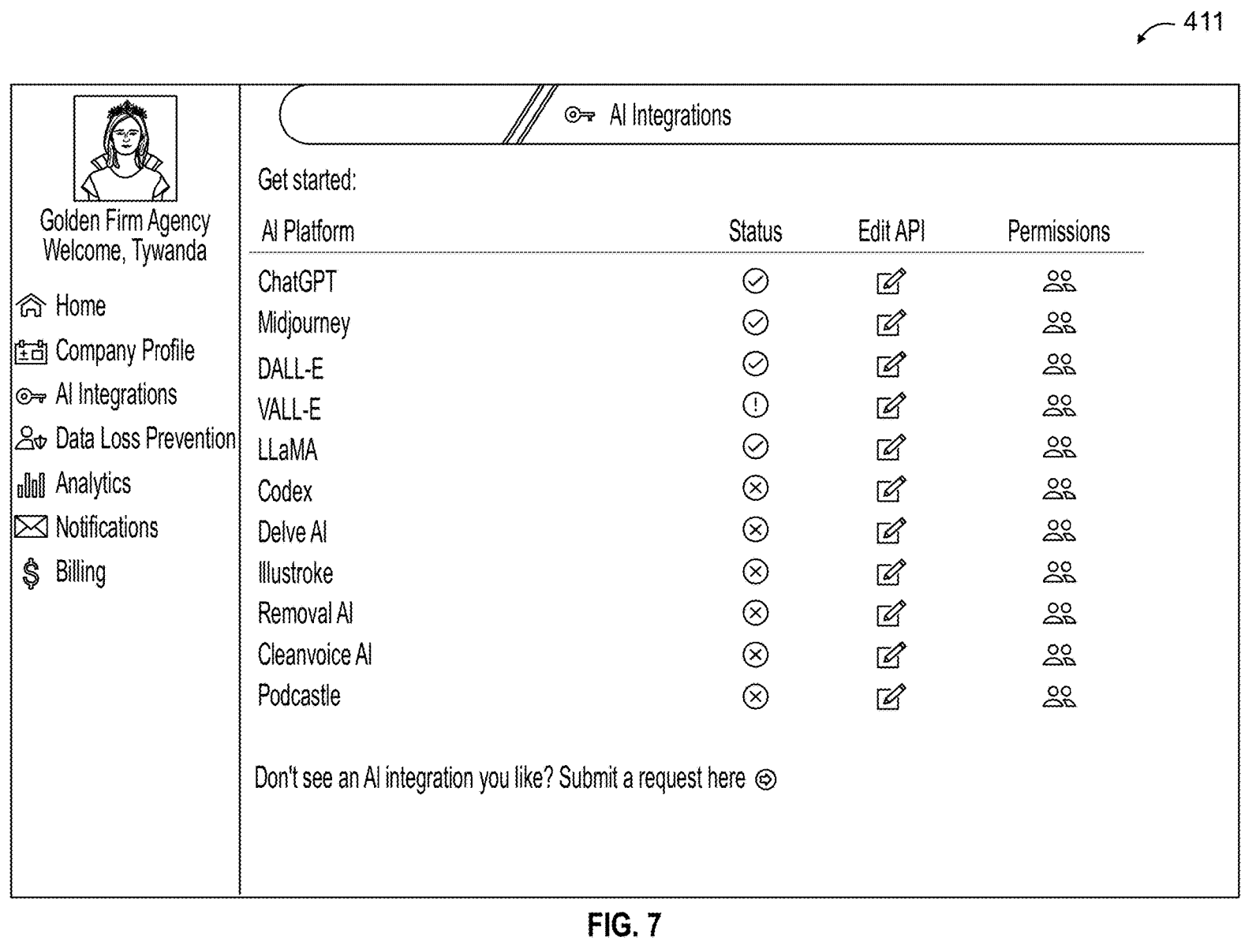
Figure 8:
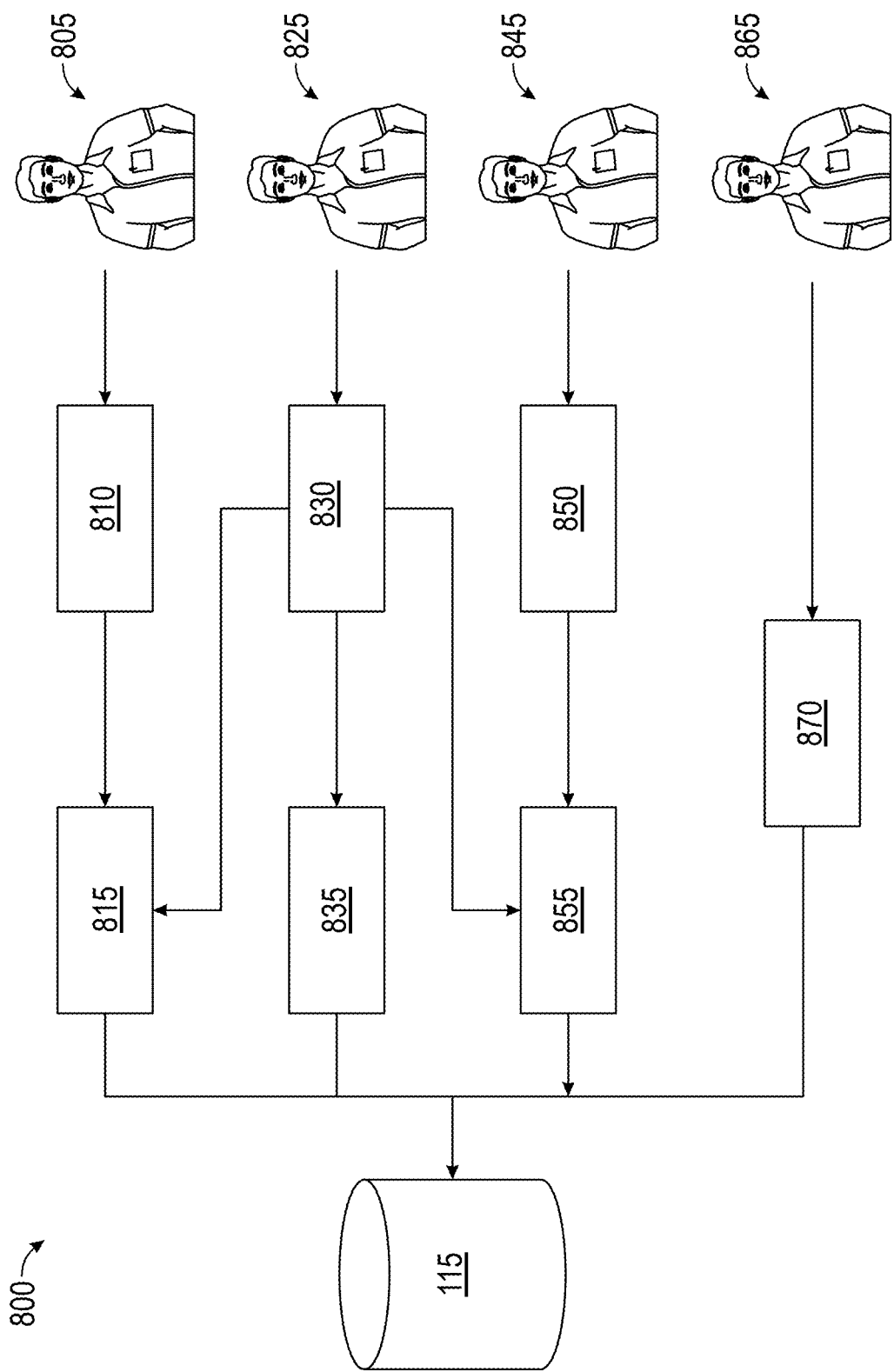
FIG. 8 is a diagram illustrating the manner in which individual access to data may be granted or limited based on user roles and administrator roles.
Figure 9:
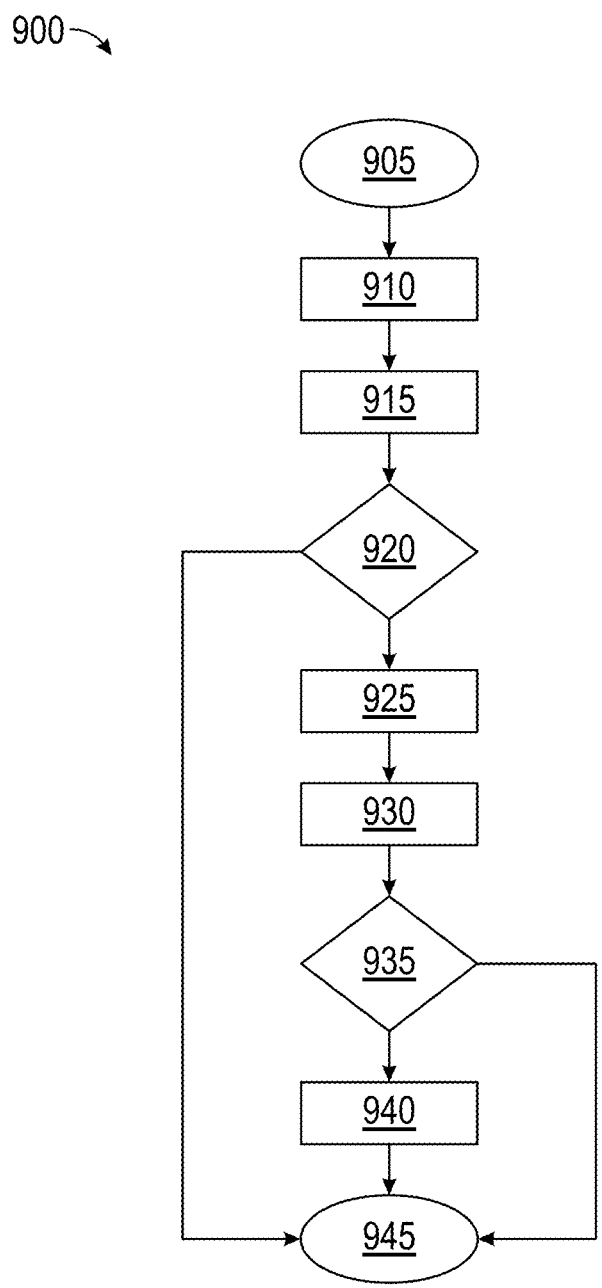
FIG. 9 is a flow chart illustrating certain method steps of a method embodying features consistent with the principles of the present disclosure.
Figure 10:
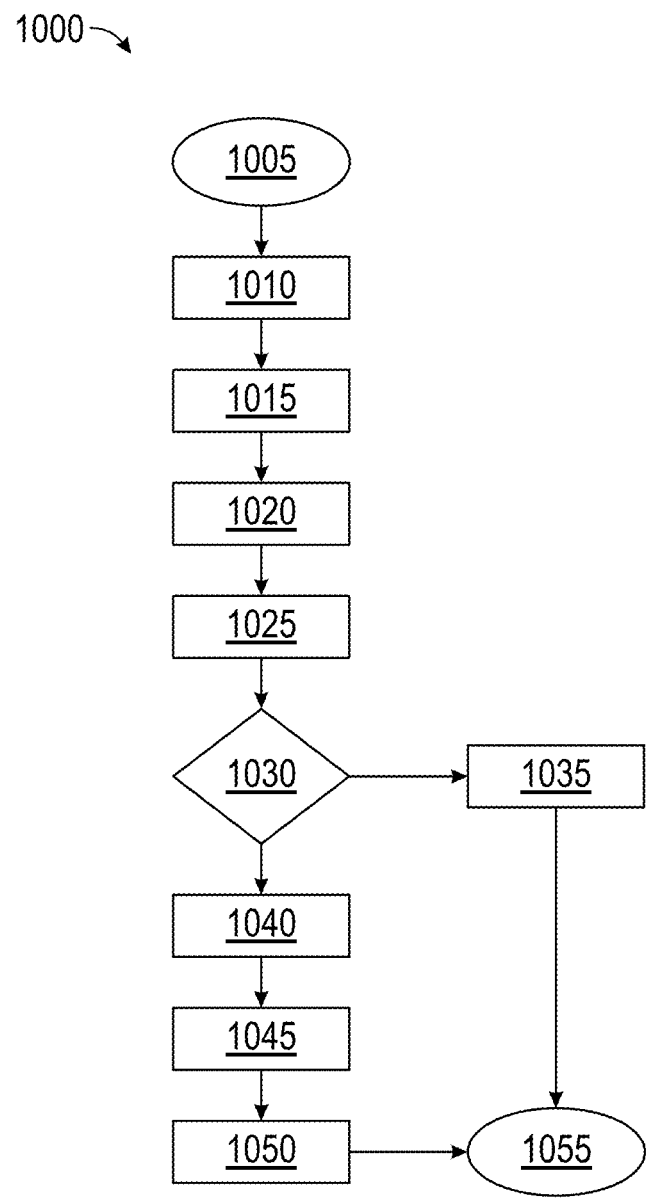
FIG. 10 is a flow chart illustrating certain method steps of a method embodying features consistent with the principles of the present disclosure.
Figure 11:
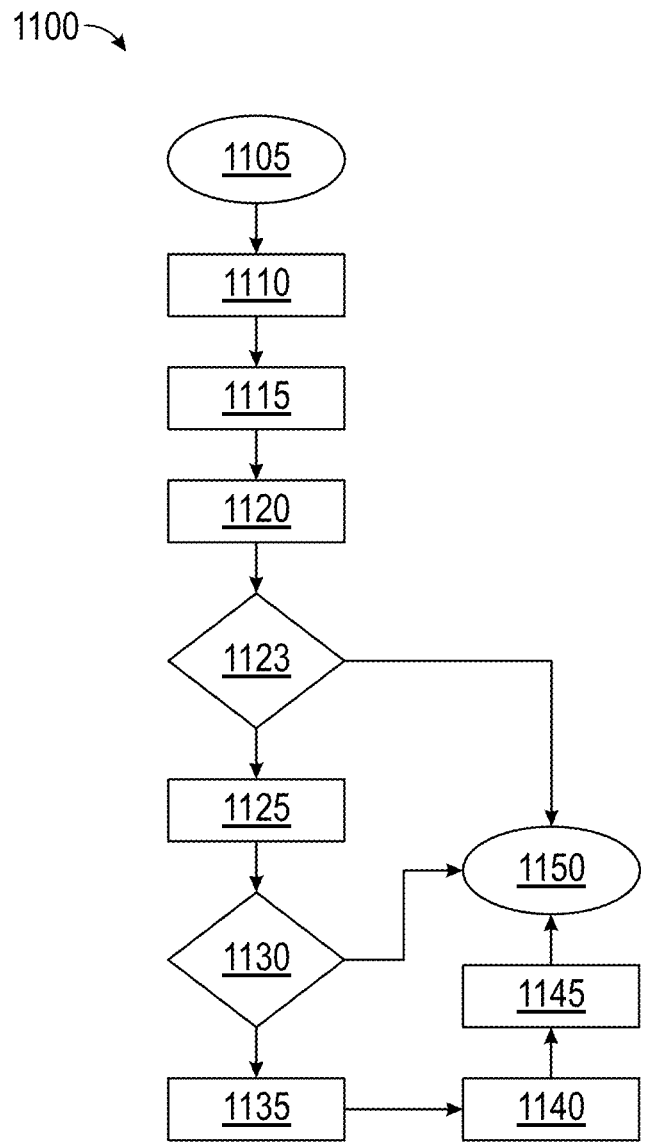
FIG. 11 is a flow chart illustrating certain method steps of a method embodying features consistent with the principles of the present disclosure.

FIGS. 4-11 illustrate embodiments of a system 400 and methods for monitoring data prior to input of the data into a machine learning model to ensure the information contained within the input data 430B is not sensitive data to the individual and/or organization. FIG. 4 illustrates a preferred embodiment of the system 400 having a computing entity 200 having a user interface 411, a security module 428, and a machine learning module 425 operably connected to one another. FIG. 5 illustrates an example user interface 411 of the computing entity 200. FIG. 6 illustrates an example user interface 411 of the computing entity 200 and a report generated by the system 400. FIG. 7 illustrates an example user interface 411 of the computing entity 200 and how a user 405 might manage machine learning modules 425 of the system 400. FIG. 8 illustrates permission levels that may be utilized by the system 400 for controlling access to user content such as user data 430A, input data 430B, and usage data 430C. FIGS. 9-11 illustrate methods that may be carried out by the system 400. It is understood that the various method steps associated with the methods of the present disclosure may be carried out as operations by the system 400 shown in FIG. 4.

Generally, a user may control the system 400 via a chat module 505 having a chat interface that in some embodiments may be integrated into an existing user interface 411 as an add-on user interface, wherein said chat module 505 may be used to incorporate additional features into an existing user interface 411 or provide team chat capabilities when not incorporated into an existing user interface 411. In a preferred embodiment, the chat module 505 allows for the incorporation of machine learning modules 425, such as natural language processing (NLP) engines, into a team environment. In embodiments where the chat module 505 is incorporated into an existing user interface 411, the system 400 may be used to incorporate machine learning modules 425 into the existing user interface 411. In embodiments of the system 400 comprising an existing user interface 411, the existing user interface 411 is preferably also a chat module 505. In some preferred embodiments, the chat module 505 may replace the information input field 505A of the existing user interface 411 and redirect input data 430B entered therein to a security module 428 of the system 400. The security module 428 may analyze the input data 430B based on security rules and take an action based on whether security rules are violated.

When a user 405 enters input data 430B into the information input field 505A and/or submits input data 430B to the information stream 505B that requests a task to be performed by a machine learning module 425 of the system 400, the processor 220 may transmit the input data 430B to the machine learning module 425, depending on the action taken by the security module 428. In one preferred embodiment, the system 400 may make recommendations to a user 405 on how they might change the input data 430B to make it compliant with security rules of the system 400 when it is determined that a security rule has been violated. In another preferred embodiment, the system 400 may alert other users 405 when a security rule has been violated. In yet another preferred embodiment, the system 400 may analyze users' engagements with machine learning techniques and create a report pertaining to said engagements. In yet another preferred embodiment, the system 400 may be configured to learn from users' engagements with the system 400 in order to facilitate more cordially and professional communication between users 405 as well as assist with scheduling of communication between users 405 to increase efficiency of an organization. In another preferred embodiment, the system 400 may be configured to use robotic process animation (RPA) in order to automate certain tasks that are commonly performed by the users 405 of the system 400.

The system 400 generally comprises a computing entity 200 having a user interface 411, a security module 428, a machine learning module 425, processor 220 operably connected to said computing entity 200, security module 428, and machine learning module 425, display operably connected to said processor 220, and non-transitory computer-readable medium coupled to said processor 220 and having instructions stored thereon. It is understood by one with skill in the art that the term computing entity 200 may be used to indicate a single computing entity or multiple computing entities that may host the various features of the system 400. In one preferred embodiment, a database 115 may be operably connected to the processor 220, and the various data of the system 400 may be stored therein, including, but not limited to, user data 430A, input data 430B, and usage data 430C. In a preferred embodiment, the various data of the system 400 transferred between the computing entities is encrypted. Other embodiments may further comprise a server operably connected to the processor 220 and database 115, facilitating the transfer of data therebetween. In another preferred embodiment, a wireless communication interface may allow the various pieces of the system 400 to receive and transmit the various data therebetween.

As previously mentioned, the processor 220 is configured to perform the operations disclosed herein based on instructions stored within the system 400. In an embodiment, the programming instructions responsible for the operations carried out by the processor 220 are stored on a non-transitory computer-readable medium ("CRM"), which may be coupled to the server, as illustrated in FIG. 4. Alternatively, the programming instructions may be stored or included within the processor 220. Examples of non-transitory computer-readable mediums include, but are not limited to, magnetic media such as hard disks, floppy disks, and magnetic tape; optical media such as CD ROM discs and DVDs; magneto-optical media such as optical discs; and hardware devices that are specifically configured to store and perform programming instructions, such as read-only memory (ROM), random access memory (RAM), flash memory, and the like. In some embodiments, the programming instructions may be stored as modules within the non-transitory computer-readable medium.

Data within the system 400 may be stored in various profiles. In a preferred embodiment, the system 400 comprises user data 430A, input data 430B, and usage data 430C that may be stored in user profiles 430. A user profile 430 may be defined as a profile containing data about a particular user 405. As used herein, user data 430A may be defined as personal information of a user 405 that helps the system 400 identify the user 405. Types of data that may be used by the system 400 as user data 430A includes, but is not limited to, a user's name, username, social security number, phone number, gender, age, address, phone number, email address, data protected by HIPPA and/or GDPR privacy rules, or any combination thereof. In some preferred embodiments, the user data may also include authentication and security data, such as passwords and security questions. In other preferred embodiments, user data may include lightweight data loss prevention preferences, such as the keywords blocklist, PII restrictions and FINRA. In yet another preferred embodiment, user data may include AI preferences that indicate to the system 400 which AI services a user wishes to use to perform a task. User data may also include user interface aesthetic preferences that allow a user to change the appearance of the user interface 411 as well as notification preferences that dictate to the system 400 when a user would like to receive alerts.

As used herein, input data 430B is data that has been input into the user interface 411 by a user 405 of the system 400. Types of data that may be used by the system 400 as input data 430B includes, but is not limited to, text data, image data, audio data, or any combination thereof. Image data may include a single image or a series of images ordered in a way that creates a video, which may or may not further include audio data. Usage data 430C may be defined as data pertaining to the individual usage of machine learning modules 425 of each user 405. User data 430A, input data 430B, and security rules in combination with permission levels are preferably used by the system 400 to assist in preventing the unwanted dissemination of privileged information to the public and/or a machine learning module 425. A user 405 is preferably associated with a particular user profile 430 based on a username. However, it is understood that a user 405 may be associated with a user profile 430 using a variety of methods without departing from the inventive subject matter herein.

In some preferred embodiments, the system 400 may separate user profiles 430 into groups and subgroups (or user roles). In a preferred embodiment, various groups and subgroups of the system 400 may grant permission levels 800 that give users 405 access to data within the system 400. For instance, the user profile 430 of a regional manager of a company may be granted permission levels 800 that allow the regional manager to manage security rules for all branches under their control, which may allow the regional manager to set a minimum level of security for users 405 within their group that includes a plurality of subgroups. A user profile 430 of a sub-user who operates a branch of the company within the regional manager's specific region may be granted permission levels 800 that grant the sub-user the ability to manage security rules within their particular subgroup so long as they do not conflict with the security rules setup by the regional manager. As such, users 405 of the system 400 may alter the security rules applicable to other users 405 of the system 400 depending on permission levels 800 of the various users and sub-users.

As illustrated in FIG. 4, the system 400 may comprise a database 115 operably connected to the processor 220. The database 115 may be operably connected to the processor 220 via wired or wireless connection. In a preferred embodiment, the database 115 is configured to store user data 430A, input data 430B, and usage data 430C therein. Alternatively, the user data 430A, input data 430B, and usage data 430C may be stored on the non-transitory computer-readable medium. The database 115 may be a relational database such that the user data 430A, input data 430B, and usage data 430C associated with each user profile 430 within the plurality of user profiles 430 may be stored, at least in part, in one or more tables. Alternatively, the database 115 may be an object database such that user data 430A, input data 430B, and usage data 430C associated with each user profile 430 within the plurality of user profiles 430 may be stored, at least in part, as objects. In some instances, the database 115 may comprise a relational and/or object database and a server dedicated solely to managing the user data 430A, input data 430B, and usage data 430C in the manners disclosed herein.

Information presented via a display may be referred to as a soft copy of the information because the information exists electronically and is presented for a temporary period of time. Information stored on the non-transitory computer-readable medium may be referred to as the hard copy of the information. For instance, a display may present a soft copy of a visual representation of image data via a liquid crystal display (LCD), wherein the hard copy of the image data may be stored on a local hard drive. For instance, a display may present a soft copy of audio information via a speaker, wherein the hard copy of the audio information is stored in memory of a mobile computing device. For instance, a display may present a soft copy of user data 430A via a hologram, wherein the hard copy of the user data 430A is stored within a database 115. Displays may include, but are not limited to, cathode ray tube monitors, LCD monitors, light emitting diode (LED) monitors, gas plasma monitors, screen readers, speech synthesizers, holographic displays, speakers, and scent generating devices, or any combination thereof, but is not limited to these devices.

A user interface 411 may be defined as a space where interactions between a user 405 and the system 400 may take place. In an embodiment, the interactions may take place in a way such that a user 405 may control the operations of the system 400. A user interface 411 may include, but is not limited to operating systems, command line user interfaces, conversational interfaces, web-based user interfaces, zooming user interfaces, touch screens, task-based user interfaces, touch user interfaces, text-based user interfaces, intelligent user interfaces, brain-computer interfaces (BCIs), and graphical user interfaces, or any combination thereof. The system 400 may present data of the user interface 411 to the user 405 via a display operably connected to the processor 220. A display may be defined as an output device that communicates data that may include, but is not limited to, visual, auditory, cutaneous, kinesthetic, olfactory, and gustatory, or any combination thereof. The computing entities themselves may further comprise a display.

Types of devices that may act as the communication interface include, but are not limited, to near field communication (NFC), Bluetooth, infrared (IR), radio-frequency communication (RFC), radio-frequency identification (RFID), and ANT+, or any combination thereof. In an embodiment, communication interfaces may broadcast signals of more than one type. For instance, a communication interface comprising an IR transmitter and RFID transmitter may broadcast IR signals and RFID signals. Alternatively, a communication interface may broadcast signals of only one type of signal. For instance, ID badges may be fitted with a communication interface that broadcast only NFC signals containing unique IDs that computing entities equipped with NFC receivers must receive before being allowed to disseminate information to a machine learning module 425.

In one preferred embodiment, the system 400 may further comprise a secondary security device, such as a biometric scanner, camera configured to collect image data for facial recognition, or ID badges having a unique identifier. In one preferred embodiment, the secondary security device may be operably connected to a computing entity 200 in a way such that it is in direct communication with the computing entity 200 and no other computing entity 200. For instance, the secondary security device may be connected to a company computing entity 200 such that a user 405 must biometrically scan their thumbprint and/or face prior to the computing entity 200 activating. This may serve as an additional precaution used to prevent the unintentional sharing of protected information, such as intellectual property and sensitive user data. The computing entity 200, server, database, and secondary security device may be connected via a wired or wireless connection.

In another preferred embodiment, the secondary security device may contain a transmitter having a unique ID, which may be transmitted to a computing entity 200 in the form of a computer readable signal before the processor 220 determines if access to the system 400 will be granted. Unique IDs contained within the signal broadcast by the transmitter may include, but are not limited to, unique identifier codes, social security numbers, PINs, etc. For instance, a computer readable signal broadcast by a secondary security device in the form of an ID badge may contain information that will alert the system 400 that a particular user 405 is within a certain range of a particular computing device, which may cause the system 400 to activate said particular computing device automatically. Alternatively, the system 400 may be configured to prevent activation of a computing entity 200 if a particular user 405 is within range of the system 400. If a user 405 without an appropriate permission level is within range of the system 400, the system 400 will not activate. For instance, sensitive research areas having the system 400 installed locally on computers may cause certain functions of the chat module 505 to not function when a visitor is within a certain predefined range of a computing device hosting the chat module 505 due to an ID badge of the visitor sending a computer readable signal to said computing device that causes the system 400 to disable said chat module 505.

Types of devices that may act as the transmitter include, but are not limited, to near field communication (NFC), Bluetooth, infrared (IR), radio-frequency communication (RFC), radio-frequency identification (RFID), and ANT+, or any combination thereof. In an embodiment, transmitters may broadcast signals of more than one type. For instance, a transmitter comprising an IR transmitter and RFID transmitter may broadcast IR signals and RFID signals. Alternatively, a transmitter may broadcast signals of only one type of signal. For instance, ID badges may be fitted with transmitters that broadcast only NFC signals containing unique IDs that computing devices equipped with NFC receivers must receive before being activated by a user 405.

A user 405 preferably inputs and accesses data of the system 400 by inputting commands/tasks within a user interface 411 of a computing entity 200. In a preferred embodiment, as illustrated in FIGS. 7 and 8, a user 405 may access data of the system 400 by using a user interface 411 of a computing entity 200 to login to a user profile 430 having permission levels 800 that allows said user 405 to input and/or access user data 430A, input data 430B, and usage data 430C of said user profile 430. After logging into said user profile 430 via said user interface 411, the user 405 may input data 430B into the chat module 505 of the user interface 411 so that the security module 428 may determine a security status of the input data 430B prior to transmitting said input data 430B to the machine learning module 425. Some preferred embodiments may further require a secondary security method before allowing the transfer of input data 430B to a machine learning module 425. For instance, the system 400 may require biometric authentication before allowing a user 405 to disseminate information to a machine learning module 425 via the user interface 411 but not require biometric authentication when the information is being shared with designated users 405 of the system 400.

In a preferred embodiment, a user 405 may select an indicium within the user interface 411 to access a chat module 505, such as an image or a "new chat button." At least one NLP engine is used by the system 400 to interpret commands entered into the chat module 505. Users 405 may alter which NLP engine is used in the chat module 505 by altering user data 430A of their user profile 430, as illustrated in FIG. 7. In a preferred embodiment, a user 405 may alter user data 430A contained within their user profile 430 via a "user preferences" window of the user interface 411. As users 405 begin to send commands, content, and messages to the NLP engine via the chat module 505, the system 400 will create a chat catalog from any input data 430B provided by the user 405 and any task data provided by the various machine learning modules 425 used by the chat module 505. In a preferred embodiment, users 405 may navigate the chat catalog to view past engagements and the resulting task data. In some preferred embodiments, the system 400 may parse the chat catalog into various data components, such as text strings, image files, document files, video files, audio files, or any combination thereof. In other preferred embodiments of the system 400, a user 405 may delete or archive chat history data should they have the appropriate permission levels 800 800.

As previously mentioned, the system 400 may react to input data entered into the chat module 505 of the chat module 505 prior to providing said input data to an AI engine. In a preferred embodiment, user data 430A may cause the system 400 to use different machine learning modules 425 depending on the command input by a user 405. For instance, the system 400 may prevent input data from being sent to a machine learning module 425 should the system 400 determine that sending said input data would result in the Point-of-Sale System (PoS) going over a maximum cost threshold as set by the user 405. Alternatively, a user 405 may input a command that causes the system 400 to override a maximum cost threshold so a user 405 may access a preferred machine learning module 425 when in need. In another preferred embodiment, the system 400 may manage how input data and task data is exchanged between various machine learning modules 425 based on user input. For instance, a user 405 may input a command that causes the system 400 to transmit first task data created by a first AI engine to a second AI engine in order to produce second task data. For instance, a user 405 may input a command to create a particular image file from text using a first machine learning module 425 and subsequently enlarge said particular image file using a second machine learning module 425. For instance, a user 405 may command the system 400 to ask an NLP engine to create a 60-second speech and subsequently submit the resulting task data to a second AI engine that will convert the text into audio file. In some embodiments, the system 400 may ask the user 405 to approve of the first task data prior to transmitting the first task data to the second machine learning module 425. Task data created by the machine learning modules 425 of the system 400 are preferably saved within the CRM and/or database.

In yet another preferred embodiment, the system 400 may be used to create new multimedia using multiple AI modules by inputting a command and a description of what is desired. For instance, a user 405 may input a command that may instruct the system 400 to create a meme as well as a description of what the user 405 would like the meme to represent. The system 400 would subsequently use an NLP module, such as ChatGPT, to generate language for the meme and subsequently instruct an AI image module, such as Midjourney, to create a meme using the description provided by the user 405 and the language generated by the NLP module. For instance, a user 405 may command the system 400 to generate a deepfake video as well as provide a description of what the user 405 would like the deepfake video to communicate. The system 400 would then create a script for the deepfake video, based on the provided description, using an NLP module and subsequently convert the script to an audio file using murf AI. Using the script and audio file, a video may be created using reface, which would then be combined with the audio file to create the final deepfake video.

In another preferred embodiment, input data may be entered into the system 400 by a user 405 to create weighted task data, wherein said weighted task data is a weighted response from at least two machine learning modules 425. For instance, a user 405 may enter a command within the chat module 505 to cause the system 400 to ask a plurality of machine learning modules 425 for a historical timeline of World War I. The system 400 may then provide a weighted response to the user 405 using all of the task data provided by the plurality of machine learning modules 425. In some preferred embodiments, the system 400 may use a machine learning module 425 to create the weighted task data. For instance, a user 405 may input a command to cause the system 400 to ask five different NLP engines to write a paper on ransomware attacks. The user 405 may then ask the system 400 to use the task data provided by the NLP engines to create a final paper, which may cause the system 400 to submit the task data from the five different NLP engines to another machine learning module 425 that combines the task data into the final paper. As previously discussed, a user 405 may automate this process such that the system 400 automatically transmits first task data from multiple machine learning modules 425 to another machine learning module 425 in order to create the weighted task data. In one preferred embodiment, a machine learning module 425 of one or more machine learning modules 425 used to create first task data may also be used to create the weighted task data. For instance, a first NLP engine, second NLP engine, and third NLP engine may be used to create first task data and the second NLP engine may be used again to combine the first task data produced by the three NLP engines into weighted task data.

In some embodiments, users 405 may create custom commands that cause the system 400 to function a certain way when said custom commands are entered into the chat module 505. In one preferred embodiment, this may be accomplished via by including octothorpe/hashtag strings within input data entered into the chat module 505. For instance, if a user 405 would like both a default NLP engine and a non-default NLP engine to produce task data for a particular command, a user 405 may add #[non-default-NLP-engine-name] to their input data, causing the system 400 to ask for task data form both the default NLP engine and the non-default NLP engine. For instance, a user 405 may enter input data to request a 1,000-word story about a family of bears in the woods and add #[non-default-NLP-engine-name (storyboard)] to cause an image AI engine to produce a storyboard of images to support the story.

As previously mentioned, the chat module 505 allows users 405 to enter input data 430B into the information input field 505A by a user 405 that is subsequently monitored by a security module 428 of the system 400 to ensure that the input data 430B doesn't violate a chosen security rule. Additional actions that may be performed by the system 400 include, but are not limited to, meeting scheduling between users 405, calendar tracking of users 405, communication pattern analyzing, communication tone and sentiment analyzing, usage analytics, billing analytics, and the automation of common tasks, including data entry and file management. When analyzing input data 430B for security violations, the system 400 transmits input data 430B to a security module 428 where the input data 430B is analyzed. In one preferred embodiment, a computing entity 200 hosts an existing user interface 411 and chat module 505 that incorporates the functions of the system 400 described herein into the existing user interface 411. A separate computing entity 200 preferably hosts the security module 428 to which the chat user interface 411 redirects input data 430B. Should the security module 428 determine that the input data 430B does not pose a security threat, the processor 220 may transmit the input data 430B to a machine learning module 425. The machine learning module 425 is preferably hosted on a computing entity that is separate from the chat module 505 and the security module 428; however, it will be understood by one with skill in the art that the chat module 505, machine learning module 525, and security module 428 may exist in any combination of computing entities without departing from the inventive subject matter described herein.

The security module 428 preferably comprises a plurality of security rules with which the security module 428 uses to inspect input data 430B that has been at least one of entered into the information input field 505A or submitted to the information stream 505B of the chat module 505. These plurality of security rules may include, but are not limited to, keywords, strings of keywords and phrases, regex patterns, voice pattern files, document templates served as "digital fingerprints," pixel evaluation for image filtering, state laws, federal laws. Special security rules may be available for the business user to enable and configure. Some examples of these special security rules are as follows but not limited to: Sensitive words and phrases (adult, crude, hate, etc.), FINRA, PII, HIPAA, Filetype, and metadata tags. or any combination thereof. In one preferred embodiment, a user 405 having appropriate permission levels 800 may create special security rules applicable only to users 405 within a certain group of the system 400. These special security rules may include certain terms and/or term strings that are forbidden for users 405 to enter as input data 430B into the system 400 to be transmitted to a machine learning module 425 of the system 400. For instance, an administrator may create a plurality of security rules pertaining to terms related to intellectual property of a corporation in which they are employed in order to prevent users 405 from publicizing said intellectual property to the public or a third-party machine learning module 425. In another preferred embodiment, the system 400 may allow users 405 having appropriate permission levels 800 to select security rules that apply to particular groups of users. For instance, a first manager of a company may modify security rules to apply to users 405 within said first manager's group that have strict tone requirements whereas a second manger within the same company may modify security rules to apply to users 405 within said second manager's group that have zero or low tone requirements. Accordingly, the system 400 of the present discloser may comprise a plurality of preset security rules that a user 405 having appropriate permission levels may select from in addition to creating customized security rules.

In some preferred embodiments, the system 400 may use one or more machine learning techniques to discern whether a security rule of the security module 528 has been violated. For instance, the system 400 may use a combination of natural language processing and reinforcement learning to discern what is being expressed within input data 430B entered into the information input field 505A. The system 400 may then use this insight into the meaning of the input data 430B to compare said input data 430B to a rule or regulation and subsequently make a determination of whether said input data 430B potentially violates a security rule. For instance, the system 400 may use machine learning techniques to analyze input data 430B patterns and provide recommendations to improve communication between users 405 or with other machine learning modules 425. For instance, the system 400 may be configured to analyze input data 430B directed towards ChatGPT that instructs ChatGPT perform a particular task and subsequently recommend alternative ways to communicate said particular task to ChatGPT.

In another preferred embodiment, the system 400 may use more than one machine learning technique to promote a more efficient working environment based on security rules. For instance, the system 400 may summarize the frequency of and content of communication between team members using Delv AI and suggest that certain members communicate more frequently, less frequently, more respectfully, more on task, etc. using machine learning modules 425 such as Grammarly. In yet another preferred embodiment, the system 400 may analyze data and create premade reports that provide snapshot overviews over a period of time using one or more machine learning modules 425. In a preferred embodiment, at least two machine learning modules 425 are used to create the premade reports. For instance, the system 400 may use Google Bard and LLaMA to analyze data and generate FAQs that may list, as well as answer, the most common questions asked by customers. Further, the system 400 may use image AI generation modules, such as Mid-Journey, to create images that may be used to assist in answering questions within the FAQs.

In another preferred embodiment, the system 400 may automate certain tasks using RPA. Types of tasks that may be automated in this manner include, but are not limited to, the scheduling of group meetings, recording of minutes of group meetings, amendments to previous minutes, updating agendas, updating calendars, file management, and user analytics. For instance, the system 400 may be configured to automatically generate monthly reports concerning user usage of the system 400, wherein said report includes data quantifying the information that machine learning modules 425 of the system 400 consumed, gathered, and generated. For instance, the system 400 may be configured to automatically schedule group meetings for a user group using Sidekick AI and record the minutes of said group meetings using a transcriber program configured to convert voice to text, such as Otter, which the system 400 may subsequently use as input data 430B. For instance, based on input data 430B of the minutes, the system 400 may automatically schedule future group meetings, amend previous minutes, update user calendars, etc., by parsing said input data 430B of said minutes for terms that would indicate such tasks need to be performed.

In some preferred embodiments, the system 400 may employ machine learning techniques to help with the automation of certain tasks. For instance, the system 400 may use deep learning to recognize patterns that may allow the system 400 to automatically schedule group meetings by discerning the availability of each user 405 of said user group. In yet another preferred embodiment, the system 400 may use machine learning techniques to automatically assess the compatibility between users 405 of a group and alert an administrator of the group when the system 400 determines there is potential conflict between group members that has or may result in a security rule violation. For instance, if two users 405 of a group have used a forbidden tone towards one another a number of times past a minimum threshold of the system 400, the processor 220 may send a message to a manager of the group and alert them of the potential conflict. RPA may also be used to automatically translate content or transcriptions into other languages as desired by a user 405. For instance, the system 400 may be configured in a way such that a virtual classroom setting will automatically translate what is said by the instructor into the preferred language of each student within the virtual classroom setting. In some preferred embodiments, the system 400 may be configured to automatically detect content that is misleading or false in order to prevent the dissemination of misleading/false information within a group. For instance, a political science research group may use automatic deepfake detection to prevent members from sharing content that has been determined to be a deepfake.

In another preferred embodiment, the system 400 may be used to help users 405 analyze SIEM data in order to further enhance security for an organization. For instance, a user 405 may configure the system 400 in a way such that it would feed SIEM data to an NLP module so that the NLP module might provide guidance or suggestions that might enhance data security for an organization. In another preferred embodiment, the system 400 may be configured to analyze SIEM data and alert an administrator when an unusual event occurs. For instance, a user 405 may configure the system 400 to provide SIEM data in real time to a machine learning module 425 configured to detect abnormal user behavior. When a user 405 downloads a number of files outside of what the user 405 normally downloads in a given time period, the system 400 may send a computer readable signal to security personnel that may inform the security personnel that the user 405 is acting abnormally by downloading a larger amount of data than what is normal. In another preferred embodiment, the system 400 may be configured to generate security reports using SIEM data, which may be used to enhance data security. For instance, the system 400 may use Power BI to create reports using Azure Sentinel data dumps that may be used to inform a company of its most problematic data security issues and why they should be addressed. For instance, the system 400 may allow a user 405 to input a command that turns Splunk SIEM data into a security report using a second machine learning module 425 that informs company security of any abnormal behavior of the various users 405 of the system 400. In some preferred embodiments, the system 400 may be used to generate reports that grade a data leak threat level that various users 405 of the system 400 might pose. In a preferred embodiment, reports generated by the system 400 allow businesses to better understand what users 405 are seeking assistance over as well as to determine what types of data are being shared with third parties.

In another preferred embodiment of the system 400, a chatbot module of the system 400 may be configured to provide real-time assistance to users 405 of the system 400. The chatbot is preferably configured to answer common questions and provide guidance on how to use functions of the system 400 more effectively. For instance, if a user 405 is having trouble sharing a file in Microsoft Teams, the chatbot could provide step-by-step instructions on how to share the file. The chatbot module may also be used to incorporate machine learning modules 425 into existing chat applications. For instance, a user 405 may incorporate the chatbot module into an existing chat application and use an indicator 515 within the input field 505A of the existing chat application to indicate that said user 405 would like a particular machine learning module 425 to perform a task. The chatbot module may then ask the machine learning module 425 to perform the indicated task and return the resulting task data to the user 405 via the information stream 505B of the existing chat application. In addition, the chatbot module may be used to cause the system 400 to perform other features of the system 400, including, but not limited to, data loss prevention, RPA, analytics, etc.

In a preferred embodiment, input data 430B is entered into an information input field 505A of the user interface 411 by a user 405 via an input device of the user's computing entity 200. A user 405 may then provide a command to the user interface 411 that requests that the input data 430B entered into the information input field 505A be placed in an information stream 505B of the user interface 411, wherein the user interface 411 will then cause the user's computing entity 200 to transmit the input data 430B to the computing entity 200 hosting the security module 428 so that said input data 430B may be examined by the security module 428 to determine if said user 405 is about to disseminate protected information in violation of any security rules of the security module 428. If the security model determines that the input data 430B does not violate a security rule, it may transmit the input data 430B to the computing entity hosting the machine learning module 425 where the machine learning module 425 can perform a task based on the input data 430B and subsequently transmit task results to said user's computing entity 200. Input data 430B submitted to the information stream 505B via the user interface 411 by a user 405 is preferably saved within a data record, which may be accessed by the system 400 in a way such that certain input data 430B may be redacted from the data record at a later time. For instance, security rules of the system 400 may be updated to include new restrictions. The security module 428 may be used to scan the data record in order to perform data loss prevention on the data record and subsequently redact any offending input data 430B of the data record, if any.

To prevent un-authorized users 405 from accessing other users' 405 information, the system 400 may employ a security method. As illustrated in FIG. 8, the security method of the system 400 may comprise a plurality of permission levels 800 that may grant users 405 access to user content 815, 835, 855 within the system 400 while simultaneously denying users 405 without appropriate permission levels 800 the ability to view user content 815, 835, 855. To access the user content 815, 835, 855 stored within the system 400, users 405 may be required to make a request via a user interface. Access to the data within the system 400 may be granted or denied by the processor 220 based on verification of a requesting user's 805, 825, 845 permission level 800. If the requesting user's 805, 825, 845 permission level 800 is sufficient, the processor 220 may provide the requesting user 805, 825, 845 access to user content 815, 835, 855 stored within the system 400. Conversely, if the requesting user's 805, 825, 845 permission level 800 is insufficient, the processor 220 may deny the requesting user 805, 825, 845 access to user content 815, 835, 855 stored within the system 400. In an embodiment, permission levels 800 may be based on user roles 810, 830, 850 and administrator roles 870, as illustrated in FIG. 8. User roles 810, 830, 850 allow requesting users 805, 825, 845 to access user content 815, 835, 855 that a user 405 has uploaded and/or otherwise obtained through use of the system 400. Administrator roles 870 allow administrators 865 to access system wide data.

In an embodiment, user roles 810, 830, 850 may be assigned to a user in a way such that a requesting user 805, 825, 845 may view user profiles 430 containing user data, input data, and usage data 430C via a user interface 411. To access the data within the system 400, a user 405 may make a user request via the user interface 411 to the processor 220. In an embodiment, the processor 220 may grant or deny the request based on the permission level 800 associated with the requesting user 805, 825, 845. Only users 405 having appropriate user roles 810, 830, 850 or administrator roles 870 may access the data within the user profiles 430. For instance, as illustrated in FIG. 8, requesting user 1 805 has permission to view user 1 content 815 and user 2 content 835 whereas requesting user 2 825 only has permission to view user 2 content 835. Alternatively, user content 815, 835, 855 may be restricted in a way such that a user may only view a limited amount of user content 815, 835, 855. For instance, requesting user 3 845 may be granted a permission level 800 that only allows them to view user 3 content 855 related to their usage of machine learning models but not other data considered user 3 content 855. In the example illustrated in FIG. 8, an administrator 865 may bestow a new permission level 800 on users 405, allowing said administrator 865 to grant said users 405 greater permission levels 800 or lesser permission levels 800. For instance, an administrator 865 having an administrator role 870 may bestow a greater permission level 800 on other users so that they may view user 3's content 855 and/or any other user's 405 content 815, 835, 855. Therefore, the permission levels 800 of the system 400 may be assigned to users 405 in various ways without departing from the inventive subject matter described herein.

Some preferred embodiments of the system 400 may further comprise a Point-of-Sale System (POS), which may be used to purchase access to the various machine learning modules 425 of the system 400. The user interface 411 of the computing entity 200 may be operably connected to a PoS that allows for the purchase of access to machine learning modules 425, which may then be incorporated into the chat module 505. In a preferred embodiment, machine learning modules 425 that may be incorporated into the chat module 505 may be presented in list form to the user 405 via the user interface 411 as indicia, allowing the user 405 to select the indicia that represents the desired machine learning module 425, as illustrated in FIG. 7; however, other methods may be used to present said machine learning modules 425 without departing from the inventive subject matter described herein. When a machine learning module 425 requiring payment is selected by the user 405 via the user interface 411, the POS may automatically communicate with the computing device in a way that allows for the user 405 to take the necessary steps to access the desired machine learning module 425. Once the desired machine learning module 425 has been purchased, the system 400 may then incorporate the machine learning module 425 into the chat module 505.

In another preferred embodiment, the POS may be used to allow the user 405 to purchase additional features of the system 400. For instance, RPA features of the system 400 may be locked in a free version of the chat module 505. By using the POS, a user 405 may unlocked the RPA features by paying a monthly. Once paid via the POS, the processor 220 may update permission levels of the user 405, allowing the user 405 to access features of the chat module 505 they may previously have been unable to access. A user 405 may access historical invoices of the POS via the user interface 411, which may be saved as user data 430A by the system 400. In a preferred embodiment, the system 400 removes invoices older than 36 months. A user 405 may update payment information stored within their user profile 430 and used by the POS via the user interface 411. In some embodiments, a group of users may have a single payment method that is stored within the user profile 430 of a user 405 of said group of users, wherein said user 405 has appropriate permission levels 800. For instance, a global administrator of a business account comprising multiple users 405 may pay for access for the entire group. In instances where more than one global administrator is assigned to a group, a second global administrator must confirm that a cancellation is necessary when a first global administrator attempts to cancel payment via the PoS.

In a preferred embodiment, the system 400 may present a plurality of billing models to a user 405 before one or more of the features of the system 400 are unlocked. Billing models that may be used by the system 400 include, but are not limited to, per user billing with preset limits; per user billing with preset limits and allowed overages in support of a budget; per user billing with the business providing their own consumption API keys to each platform and is responsible for their usage by DLP budgets; per user billing with the business using system 400 owned API keys and therefore will be billed on per call consumption model; per user billing for archived users, private hosting consulting fees; private hosting customization labor; per user billing when on private hosted solution; and support hours; or any combination thereof. The computing device may be operably connected to the POS via the Bluetooth, Wi-Fi, or other such transceiver, but is not limited to these methods of communication.

FIG. 9 provides a flow chart 900 illustrating certain, preferred method steps that may be used to carry out the method of checking input data against a security rule. Step 905 indicates the beginning of the method. During step 910, the processor 220 may accept input data from an input device of the system 400, wherein said input data is entered into said system 400 by a user 405. The processor 220 may perform a query for security rules based on the user's user data within said user's user profile and/or group data of said user's particular group during step 915. In a preferred embodiment, the processor 220 may query the non-transitory computer-readable medium and/or database for security rules relevant to the user data 430A and/or group data. Based on the results of the query, the processor 220 may take an action during step 920. If the processor 220 determines that there are no security rules found to be applicable to a particular user 405, the system 400 may proceed to the terminate method step 945. If the processor 220 determines that there are security rules found to be applicable to a particular user 405, the system 400 may proceed to step 925.

During step 925, the processor 220 may retrieve the security rules relevant to the user 405 and/or group. Once retrieved, the processor 220 may perform a query during step 930 to determine if a security rule has been violated by the user 405. In a preferred embodiment, the system 400 looks for forbidden terms and term strings within the security rules to determine if a security rule has been violated. Based on the results of the query, the processor 220 may take an action during step 935. If it is determined that the input data does not violate a security rule, the system 400 may proceed to terminate method step 945. If the processor 220 determines that input data does violate a security rule of the system 400, the processor 220 may prevent the input data from being employed in a manner that may result in a security breach during step 940. In some preferred embodiments, the system 400 may also be configured to alert a user 405 of the system 400 of a violation of a security rule. Once the system 400 has prevented offending input data from being employed in a manner that may result in a security breach, the system 400 may proceed to the terminate method step 945.

FIG. 10 provides a flow chart 1000 illustrating certain, preferred method steps that may be used to carry out the method of a chat module 505 receiving input data from an existing chat application and performing a desired task. Step 1005 indicates the beginning of the method. During step 1010, the processor 220 may receive input data including a chat module indicator 515 from a user 405 via an input device, wherein said input data, including the chat module indicator 515, is entered into an information input field 505A of an existing chat application. The processor 220 may then transmit the input data to the chat module 505 during step 1015 and subsequently determine which machine learning module 425 is to be used based on the chat module indicator 515 during step 1020. Once the chat module 505 has received the input data, it may perform a query to determine which task is to be performed during step 1025. Based on the results of the query, the processor 220 may take an action during step 1030. If no task can be determined based on the input data, the system 400 may send a computer readable signal to an information stream 505B of the chat module 505, indicating that no task can be performed based on said input data during step 1035, as illustrated in FIG. 5, and subsequently proceed to terminate method step 1055. If it is determined that a task may be performed, the processor 220 may send a computer readable signal to the determined machine learning module 425 that contains instructions for a task to be performed during step 1040. In some preferred embodiments, the chat module 505 may be configured to send the input data to a security module 428 to determine if the input data violates a security rule before sending the input data to a machine learning module 425. During step 1045, the processor 220 may transmit completed task data of the machine learning module 425 to the chat module 505 and subsequently transmit said completed task data from the chat module 505 to the information stream 505B of the existing chat application during step 1050. Once the completed task data has been transmitted to the existing chat application, the system 400 may proceed to the terminate method step 1055.

FIG. 11 provides a flow chart 1100 illustrating certain, preferred method steps that may be used to carry out the method of collecting information of users 405 and generating reports pertaining to user consumption and use of machine learning modules 425. Step 1105 indicates the beginning of the method. During step 1110, the processor 220 may collect usage data from a plurality of users 405 and subsequently save the usage data in the users' user profiles during step 1115, wherein said usage data pertains to the machine learning module 425 used by each user 405; the information provided to said machine learning module 425; the information gathered by said machine learning module 425 in light of said information provided; and the task data generated by the machine learning module 425. The system 400 may then perform a query to determine if a user 405 has requested a usage analysis during step 1120. Based on the results of the query, the system 400 may perform an action during step 1123. If the system 400 determines that no user 405 has requested a usage analysis, the system 400 may proceed to terminate method step 1150. If the system 400 determines that a user 405 has requested a usage analysis, the system 400 may then perform a query to determine if said user 405 has appropriate permission levels to receive a usage analysis during step 1125. Based on the results of the query, the processor 220 may take an action during step 1130. If the system 400 determines that the user 405 does not have appropriate permission levels 800 to receive a usage analysis, the system 400 may proceed to terminate method step 1150. If the system 400 determines that the user 405 does have appropriate permission levels 800 to receive a usage analysis, the system 400 may determine which users 405 and/or group of users are specified in the input data and subsequently generate a usage report during steps 1135 and 1140, respectively. The system 400 may transmit the usage report to the user 405 during step 1145 before proceeding to terminate method step 1150.

The subject matter described herein may be embodied in systems, apparati, methods, and/or articles depending on the desired configuration. In particular, various implementations of the subject matter described herein may be realized in digital electronic circuitry, integrated circuitry, specially designed application specific integrated circuits (ASICs), computer hardware, firmware, software, and/or combinations thereof. These various implementations may include implementation in one or more computer programs that may be executable and/or interpretable on a programmable system including at least one programmable processor, which may be special or general purpose, coupled to receive data and instructions from, and to transmit data and instructions to, a storage system, and at least one peripheral device.

These computer programs, which may also be referred to as programs, software, applications, software applications, components, or code, may include machine instructions for a programmable processor, and may be implemented in a high-level procedural and/or object-oriented programming language, and/or in assembly machine language. As used herein, the term "non-transitory computer-readable medium" refers to any computer program, product, apparatus, and/or device, such as magnetic discs, optical disks, memory, and Programmable Logic Devices (PLDs), used to provide machine instructions and/or data to a programmable processor, including a non-transitory computer-readable medium that receives machine instructions as a computer-readable signal. The term "computer-readable signal" refers to any signal used to provide machine instructions and/or data to a programmable processor. To provide for interaction with a user, the subject matter described herein may be implemented on a computer having a display, such as a cathode ray tube (CRD), liquid crystal display (LCD), light emitting display (LED) monitor for displaying information to the user and a keyboard and a pointing device, such as a mouse or a trackball, by which the user may provide input to the computer. Displays may include, but are not limited to, visual, auditory, cutaneous, kinesthetic, olfactory, and gustatory displays, or any combination thereof.

Other kinds of devices may be used to facilitate interaction with a user as well. For instance, feedback provided to the user may be any form of sensory feedback, such as visual feedback, auditory feedback, or tactile feedback; and input from the user may be received in any form including, but not limited to, acoustic, speech, or tactile input. The subject matter described herein may be implemented in a computing system that includes a back-end component, such as a data server, or that includes a middleware component, such as an application server, or that includes a front-end component, such as a client computer having a graphical user interface or a Web browser through which a user may interact with the system described herein, or any combination of such back-end, middleware, or front-end components. The components of the system may be interconnected by any form or medium of digital data communication, such as a communication network. Examples of communication networks may include, but are not limited to, a local area network ("LAN"), a wide area network ("WAN"), metropolitan area networks ("MAN"), and the internet.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For instance, the implementations described above can be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results. It will be readily understood to those skilled in the art that various other changes in the details, devices, and arrangements of the parts and method stages which have been described and illustrated in order to explain the nature of this inventive subject matter can be made without departing from the principles and scope of the inventive subject matter.

What is claimed is:

1. One or more non-transitory computer-readable medium coupled to a processor, having instructions stored thereon, which, when executed by said processor, cause said processor to perform operations of:
   receiving input data from an add-on user interface that is incorporated into an existing user interface,
      wherein said add-on user interface intercepts said input data entered into said existing user interface,
      wherein said add-on user interface is operably connected to a plurality of machine learning techniques,
      determining if said input data contains an intelligence indicator,
      wherein said intelligence indicator specifies which machine learning technique of said plurality of machine learning techniques is to be used to process said input data,
      wherein said intelligence indicator specifies creation of first task data via a first machine learning technique and second task data via a second machine learning technique,
   transmitting said input data intercepted by said add-on user interface to said machine learning technique as specified by said intelligence indicator when said input data includes said intelligence indicator,
   creating task data based on said input data via said machine learning technique as specified by said intelligence indicator,
      wherein said task data is generated by said machine learning technique according to task instructions contained within said input data,
   transmitting said task data generated by said machine learning technique to said existing user interface, and
   presenting said task data generated by said machine learning technique via said existing user interface.

2. The one or more non-transitory computer-readable medium of claim 1, wherein said input data is inspected for a violation of security rules prior to transmission to said machine learning technique.

3. The one or more non-transitory computer-readable medium of claim 1, further comprising additional instructions, which, when executed by said processor, cause said processor to perform additional operations comprising:
   inspecting said input data for a violation of security rules prior to transmission to said machine learning technique.

4. The one or more non-transitory computer-readable medium of claim 1, wherein said intelligence indicator specifies creation of third task data via a third machine learning technique using said first task data and said second task data.

5. The one or more non-transitory computer-readable medium of claim 4, further comprising additional instructions, which, when executed by said processor, cause said processor to perform additional operations comprising:

creating first task data via a first machine learning technique as specified by said intelligence indicator,
creating second task data via a second machine learning technique as specified by said intelligence indicator,
creating third task data via a third machine learning technique as indicated by said intelligence indicator,
wherein said first task data and said second task data are provided to said third machine learning technique to assist with creation of said third task data,
transmitting said third task data generated by said third machine learning technique to said existing user interface, and
presenting said third task data via said existing user interface.

6. The one or more non-transitory computer-readable medium of claim 1, further comprising additional instructions, which, when executed by said processor, cause said processor to perform additional operations comprising:
saving said input data and said task data within a data record.

7. The one or more non-transitory computer-readable medium of claim 6, further comprising additional instructions stored, which, when executed by said processor, cause said processor to perform additional operations comprising:
inspecting said input data and said task data saved within said data record for a violation of security rules.

8. The one or more non-transitory computer-readable medium of claim 7, further comprising additional instructions, which, when executed by said processor, cause said processor to perform additional operations comprising:
removing said input data and said task data from said data record when said violation of said security rules is determined.

9. One or more non-transitory computer-readable medium coupled to a processor, having instructions stored thereon, which, when executed by said processor, cause said processor to perform operations of:
receiving input data from an add-on user interface that is incorporated into an existing user interface,
wherein said add-on user interface intercepts said input data entered into said existing user interface,
wherein said add-on user interface is operably connected to a plurality of machine learning techniques,
determining if said input data contains an intelligence indicator,
wherein said intelligence indicator specifies which machine learning technique of said plurality of machine learning techniques is to be used as a first machine learning technique to process said input data,
wherein said intelligence indicator specifies which said machine learning technique of said plurality of machine learning techniques is to be used as a second machine learning technique to process said input data,
transmitting said input data intercepted by said add-on user interface to said first machine learning technique as specified by said intelligence indicator when said input data includes said intelligence indicator,
transmitting said input data intercepted by said add-on user interface to said second machine learning technique as specified by said intelligence indicator when said input data includes said intelligence indicator,
creating first task data based on said input data via said first machine learning technique as specified by said intelligence indicator,
wherein said first task data is generated by said first machine learning technique according to task instructions contained within said input data,
creating second task data based on said input data via said second machine learning technique as specified by said intelligence indicator,
wherein said second task data is generated by said second machine learning technique according to said task instructions contained within said input data,
transmitting said first task data generated by said first machine learning technique and said second task data generated by said second machine learning technique to said existing user interface, and
presenting said first task data and said second task data via said existing user interface.

10. The one or more non-transitory computer-readable medium of claim 9, wherein said input data is inspected for a violation of security rules prior to transmission to said first machine learning technique and said second machine learning technique.

11. The one or more non-transitory computer-readable medium of claim 9, further comprising additional instructions, which, when executed by said processor, cause said processor to perform additional operations comprising:
inspecting said input data for a violation of security rules prior to transmission to said machine learning technique.

12. The one or more non-transitory computer-readable medium of claim 9, wherein said intelligence indicator specifies creation of third task data via a third machine learning technique using said first task data and said second task data.

13. The one or more non-transitory computer-readable medium of claim 12, further comprising additional instructions, which, when executed by said processor, cause said processor to perform additional operations comprising:
creating third task data via a third machine learning technique as indicated by said intelligence indicator,
wherein said first task data and said second task data are provided to said third machine learning technique to assist with creation of said third task data,
transmitting said third task data generated by said third machine learning technique to said existing user interface, and
presenting said third task data via said existing user interface.

14. The one or more non-transitory computer-readable medium of claim 9, further comprising additional instructions, which, when executed by said processor, cause said processor to perform additional operations comprising:
saving said input data, first task data, and second task data within a data record.

15. The one or more non-transitory computer-readable medium of claim 14, further comprising additional instructions, which, when executed by said processor, cause said processor to perform additional operations comprising:
inspecting said input data, first task data, and second task data saved within said data record for a violation of security rules.

16. The one or more non-transitory computer-readable medium of claim 15, further comprising additional instructions, which, when executed by said processor, cause said processor to perform additional operations comprising:
removing said input data, first task data, and second task data from said data record when said violation of said security rules is determined.

17. One or more non-transitory computer-readable medium coupled to a processor, having instructions stored thereon, which, when executed by said processor, cause said processor to perform operations of:
- receiving input data from an add-on user interface that is incorporated into an existing user interface,
  - wherein said add-on user interface intercepts said input data entered into said existing user interface,
  - wherein said add-on user interface is operably connected to a plurality of machine learning techniques,
- determining if said input data contains an intelligence indicator,
  - wherein said intelligence indicator specifies which machine learning technique of said plurality of machine learning techniques is to be used as a first machine learning technique to process said input data,
  - wherein said intelligence indicator specifies which said machine learning technique of said plurality of machine learning techniques is to be used as a second machine learning technique to process said input data,
- transmitting said input data intercepted by said add-on user interface to said first machine learning technique as specified by said intelligence indicator when said input data includes said intelligence indicator,
- transmitting said input data intercepted by said add-on user interface to said second machine learning technique as specified by said intelligence indicator when said input data includes said intelligence indicator,
- creating first task data based on said input data via said first machine learning technique as specified by said intelligence indicator,
  - wherein said first task data is generated by said first machine learning technique according to task instructions contained within said input data,
- creating second task data based on said input data via said second machine learning technique as specified by said intelligence indicator,
  - wherein said second task data is generated by said second machine learning technique according to said task instructions contained within said input data,
- transmitting said first task data generated by said first machine learning technique and said second task data generated by said second machine learning technique to a third machine learning technique as indicated by said intelligence indicator,
- creating third task data with assistance from said first task data and said second task data via said third machine learning technique as specified by said intelligence indicator,
- transmitting said third task data generated by said third machine learning technique to said existing user interface, and
- presenting said third task data within said existing user interface.

18. The one or more non-transitory computer-readable medium of claim 17, further comprising additional instructions, which, when executed by said processor, cause said processor to perform additional operations comprising:
- saving said input data and said third task data within a data record.

19. The one or more non-transitory computer-readable medium of claim 18, further comprising additional instructions, which, when executed by said processor, cause said processor to perform additional operations comprising:
- inspecting said input data and said third task data saved within said data record for a violation of security rules, and
- removing said input data and said third task data from said data record when said violation of said security rules is determined.

* * * * *